United States Patent
Gholmieh et al.

(10) Patent No.: US 11,109,268 B2
(45) Date of Patent: Aug. 31, 2021

(54) SIZE OPTIMIZED ENCODING OF CAPABILITY STRUCTURE FOR MULTICARRIER SYSTEMS

(71) Applicant: QUALCOMM Incorporated, San Diego, CA (US)

(72) Inventors: Aziz Gholmieh, Del Mar, CA (US); Roland Rick, Arvada, CO (US); Alexei Yurievitch Gorokhov, San Diego, CA (US); Srinivasan Balasubramanian, San Diego, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/272,710

(22) Filed: Feb. 11, 2019

(65) Prior Publication Data
US 2019/0253925 A1    Aug. 15, 2019

Related U.S. Application Data

(60) Provisional application No. 62/631,497, filed on Feb. 15, 2018, provisional application No. 62/634,757, filed on Feb. 23, 2018.

(51) Int. Cl.
*H04W 28/06*    (2009.01)
*H04W 8/24*    (2009.01)
(Continued)

(52) U.S. Cl.
CPC .......... *H04W 28/06* (2013.01); *H04B 1/005* (2013.01); *H04L 5/001* (2013.01); *H04L 5/0091* (2013.01);
(Continued)

(58) Field of Classification Search
None
See application file for complete search history.

(56) References Cited

U.S. PATENT DOCUMENTS

2017/0289877 A1*  10/2017  Wu .................. H04W 36/0055
2018/0219652 A1*  8/2018  Chen .................... H04B 7/0626
(Continued)

FOREIGN PATENT DOCUMENTS

WO       2017013113 A1    1/2017
WO    WO 2017/013113   *   1/2017

OTHER PUBLICATIONS

Ericsson: "Discussions on BW Class, MIMO/CSI Capabilities, Fallback and Other Issues Related to FeCA Feature", 3GPP Draft; R4-157973 FeCA RAN2 LS Discussions REV1, 3rd Generation Partnership Project (3GPP), vol. RAN WG4, No. Anaheim, CA, USA; Nov. 16, 2015-Nov. 20, 2015, Nov. 9, 2015 (Nov. 9, 2015), 5 Pages, XP051028838, Retrieved from the Internet: URL: http://www.3gpp.org/ftp/tsg_ran/WG4_Radio/TSGR4_77/Docs/ [retrieved on Nov. 9, 2015], Sections 2 and 3.
(Continued)

*Primary Examiner* — Christopher T Wyllie
(74) *Attorney, Agent, or Firm* — Qualcomm Incorporated

(57) ABSTRACT

A UE apparatus determines UE capability and signals UE capability information to a base station. The UE may signal RF capability information to the base station with reference to at least one band combination and signal other baseband parameter(s) (obp(s)) to the base station. The RF capability information indicate RF capability with reference to at least one other band combination parameter. The obp may be indicated on a per UE basis, a per band basis, a per band combination basis, a per band, per band combination basis; and/or a per CC, per band, per band combination basis. Each band combination may indicate a combination of a numerology, a layer and a bandwidth. In another example, a plurality of basebands may be defined, each baseband indicating a combination of a numerology, a layer and a bandwidth.

44 Claims, 18 Drawing Sheets

(51) Int. Cl.
    *H04W 76/11*       (2018.01)
    *H04L 25/02*       (2006.01)
    *H04W 28/02*       (2009.01)
    *H04L 5/00*        (2006.01)
    *H04B 1/00*        (2006.01)

(52) U.S. Cl.
    CPC .......... *H04L 25/0262* (2013.01); *H04W 8/24* (2013.01); *H04W 28/0215* (2013.01); *H04W 76/11* (2018.02)

(56) References Cited

U.S. PATENT DOCUMENTS

| | | | |
|---|---|---|---|
| 2019/0020440 A1* | 1/2019 | Santhanam | H04W 4/70 |
| 2019/0141695 A1* | 5/2019 | Babaei | H04W 72/048 |
| 2019/0253925 A1* | 8/2019 | Gholmieh | H04L 5/001 |
| 2019/0305914 A1* | 10/2019 | Lee | H04W 24/08 |

OTHER PUBLICATIONS

International Search Report and Written Opinion—PCT/US2019/017713—ISA/EPO—dated Apr. 23, 2019.

Qualcomm Incorporated: "CA Capability Signaling Overview", 3GPP Draft; R4-1802826, 3rd Generation Partnership Project (3GPP), Mobile Competence Centre, 650, Route Des Lucioles; F-06921 Sophia-Antipolis Cedex, France, vol. RAN WG4, No. Athens, Greece; Feb. 26, 2018-Mar. 2, 2018, Feb. 19, 2018 (Feb. 19, 2018), 15 Pages, XP051403244, Retrieved from the Internet: URL: http://www.3gpp.org/ftp/tsg_ran/WG4_Radio/TSGR4_86/Docs/ [retrieved on Feb. 19, 2018], Sections 3, 4 and 5.

Qualcomm Incorporated: "UE Capability Structure of NR and MR-DC," 3GPP Draft; R2-1712369, vol. RAN WG2, No. Reno, Nevada, USA; Nov. 27, 2017-Dec. 1, 2017, Nov. 17, 2017, XP051371437, 5 pages, Retrieved from the Internet: URL: http://www.3gpp.org/ftp/tsg_ran/WG2_RL2/TSGR2_100/Docs/ [retrieved on Nov. 17, 2017], Sections 1-3, Sections 2.1, 2.2.

* cited by examiner

SIZE OPTIMIZED ENCODING OF CAPABILITY STRUCTURE FOR MULTICARRIER SYSTEMS

CROSS-REFERENCE TO RELATED APPLICATION(S)

This application claims the benefit of U.S. Provisional Application Ser. No. 62/631,497, entitled "Size Optimized Encoding of Capability Structure for Multicarrier Systems" and filed on Feb. 15, 2018, and U.S. Provisional Application Ser. No. 62/634,757, entitled "Size Optimized Encoding of Capability Structure for Multicarrier Systems" and filed on Feb. 23, 2018, the entire contents of both of which are expressly incorporated by reference herein in their entirety.

BACKGROUND

Technical Field

The present disclosure relates generally to wireless communication systems, and more particularly, to the encoding and communication of User Equipment (UE) capability in a multicarrier system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for a UE. A UE apparatus determines UE capability and signals UE capability information to a base station. The UE signals RF capability information to the base station with reference to at least one band combination and signals other band combination parameters to the base station, wherein the RF capability information indicates RF capability with reference to at least one other band combination parameter and at least one other band parameter.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
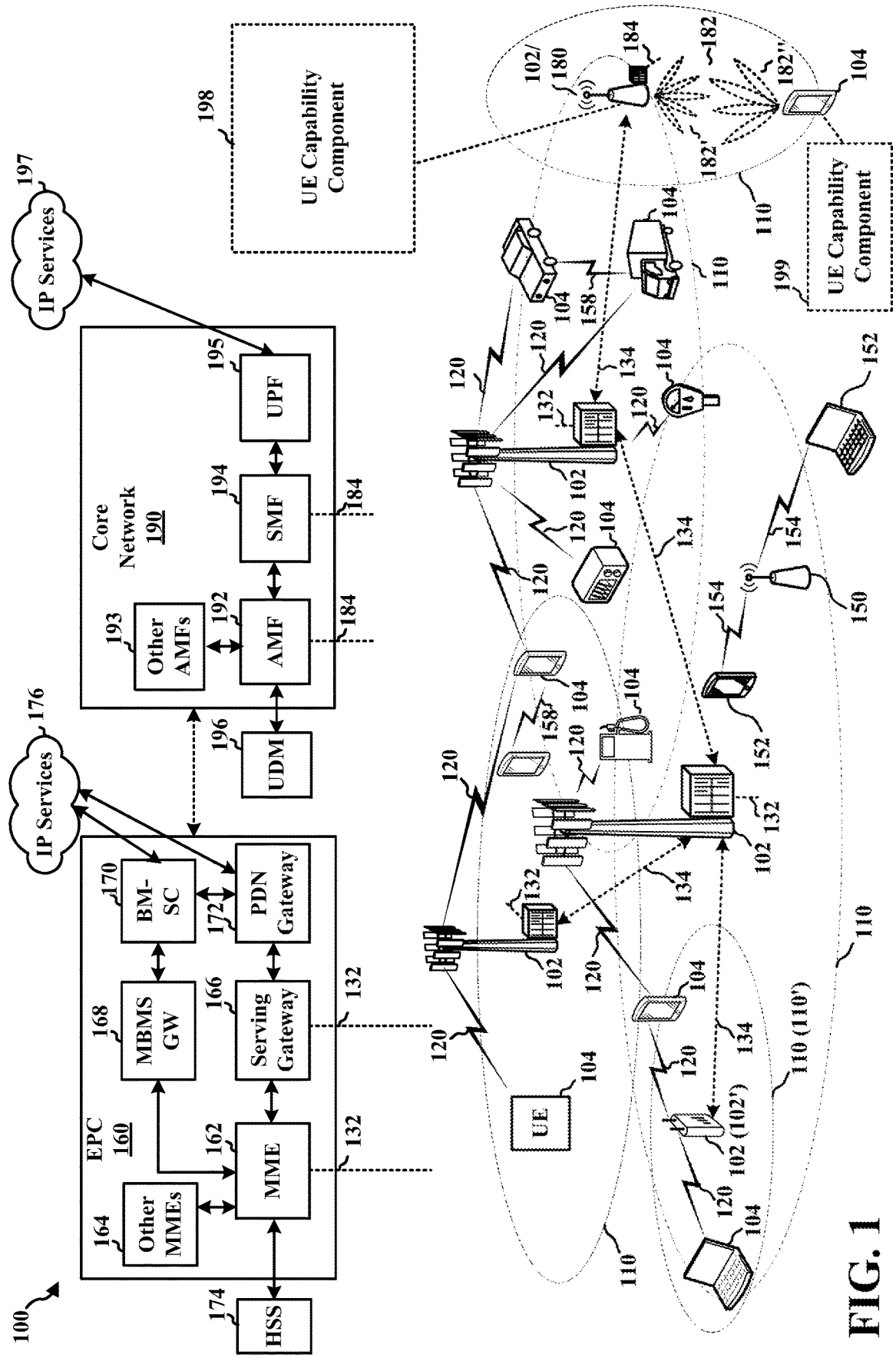
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a core network 190 (e.g., a 5G Core (5GC)). The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to include a UE capability component 199 to encode, communicate, or process a UE capability, e.g., as described herein. The UE 104 may determine UE capability and signal UE capability information to a base station 102/180. The UE may signal RF capability information to the base station with reference to at least one band combination and signal other baseband parameters (obp) to the base station. The RF capability information indicate RF capability with reference to at least one obp. The obp may be indicated on a per UE basis, a per band basis, a per band combination basis, a per band, per band combination basis; and/or a per CC, per band, per band combination basis. The obp may indicate, e.g., different parameters than bandwidth, layers, and numerology. Similarly, the base station 102, 180 may comprise a UE capability component 198 configured to receive the UE capability information and to determine UE capabilities base thereon.

Figure 2:
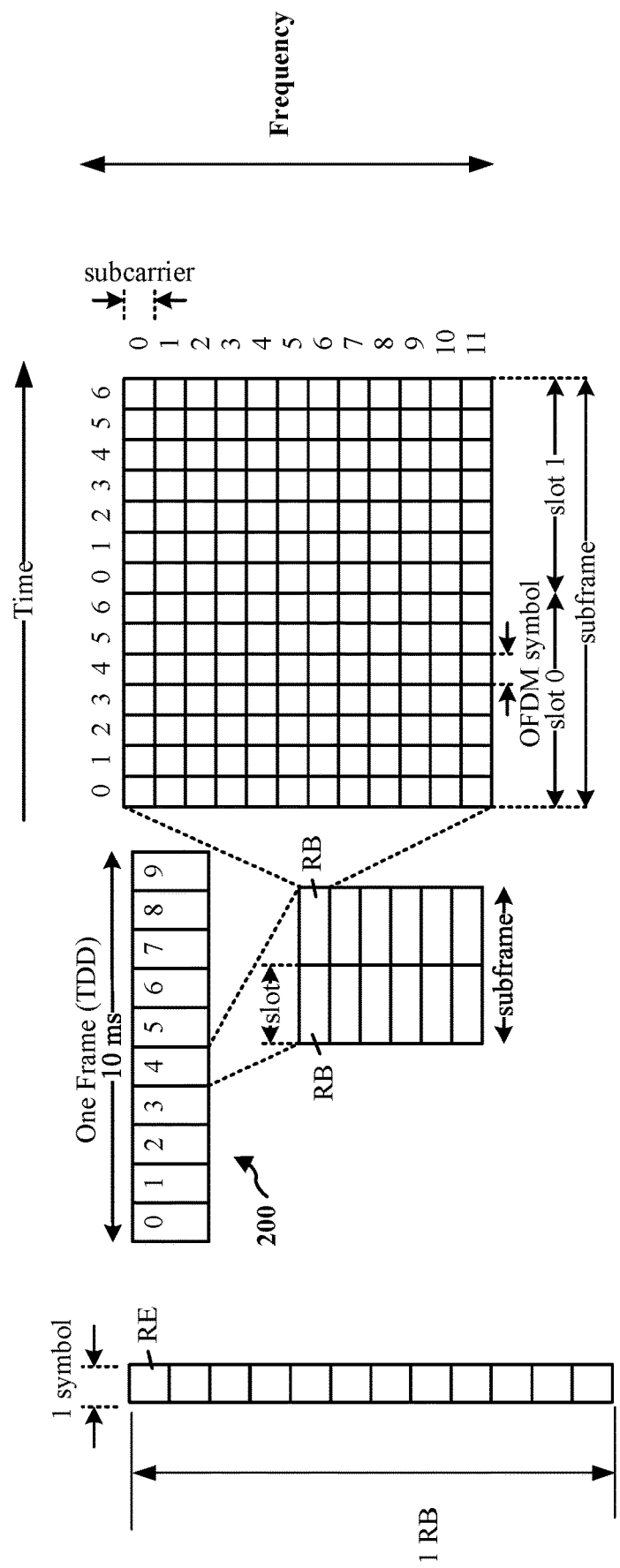
FIG. 2 is a diagram illustrating an example of a 5G/NR frame structure.

FIG. 2 is a diagram 200 illustrating an example frame structure, e.g., that may be used within a 5G/NR frame structure. The frame structure may define resources in time and frequency for wireless communication. The frame structure may be for uplink or downlink subframes. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the example illustrated in FIG. 2, the frame structure is TDD, with DL subframes and/or UL subframes. Any particular subframe may be split into different subsets that provide both UL and DL. Note that the description infra applies also to a 5G/NR frame structure that is FDD.

Other wireless communication technologies may have a different frame structure and/or different channels. A frame (e.g., 10 ms) may be divided into equally sized subframes, such as 10 equally sized subframes (1 ms). Each subframe may include one or more time slots. Each slot may include a defined number of symbols, e.g., 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration may be a function of the numerology. The subcarrier spacing may be equal to $2^\mu * 15$ kKz, where $\mu$ is the numerology 0-5. The symbol length/duration is inversely related to the subcarrier spacing. One example of subcarrier spacing is 15 kHz, and one example of symbol duration is approximately 66.7 μs.

A resource grid may be used to represent the frame structure. Each time slot may include a resource block (RB) (also referred to as physical RBs (PRBs)) that extends for a certain number of consecutive subcarriers. In FIG. 2, 12 consecutive subcarriers are illustrated. The resource grid may be divided into multiple resource elements (REs). The number of bits carried by each RE may depend on the modulation scheme.

Some of the REs may carry reference (pilot) signals (RS) for the UE (indicated as R). The RS may include demodulation RS (DM-RS) and channel state information reference signals (CSI-RS) for channel estimation at the UE. The RS may also include beam measurement RS (BRS), beam refinement RS (BRRS), and phase tracking RS (PT-RS).

Various channels may be comprised within a DL subframe of a frame. Examples of possible channels may include a physical control format indicator channel (PCFICH) that carries a control format indicator (CFI) that indicates which symbols the physical downlink control channel (PDCCH) occupies, a PDCCH carrying downlink control information (DCI) within one or more control channel elements (CCEs), each CCE including nine RE groups (REGs), each REG including four consecutive REs in an OFDM symbol, a UE-specific enhanced PDCCH (ePDCCH) that also carries DCI, a physical hybrid automatic repeat request (ARQ) (HARQ) indicator channel (PHICH) that carries the HARQ indicator (HI) that indicates HARQ acknowledgement (ACK)/negative ACK (NACK) feedback based on the physical uplink shared channel (PUSCH), and a primary synchronization channel (PSCH). The PSCH may carry a primary synchronization signal (PSS) that is used by a UE 104 to determine subframe/symbol timing and a physical layer identity. A secondary synchronization channel (SSCH) be included in the frame, e.g., carrying a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. A physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). A physical downlink shared channel (PDSCH) may carry user data, broadcast system information not transmitted through the PBCH such as system information blocks (SIBs), and paging messages.

Some of the REs may carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

Example uplink channels include a physical random access channel (PRACH) that allows the UE to perform initial system access and achieve UL synchronization, and a physical uplink control channel (PUCCH) that carriers uplink control information (UCI), such as scheduling requests, a channel quality indicator (CQI), a precoding matrix indicator (PMI), a rank indicator (RI), and HARQ ACK/NACK feedback. The PUSCH may carry data, and may additionally be used to carry a buffer status report (BSR), a power headroom report (PHR), and/or UCI.

Figure 3:
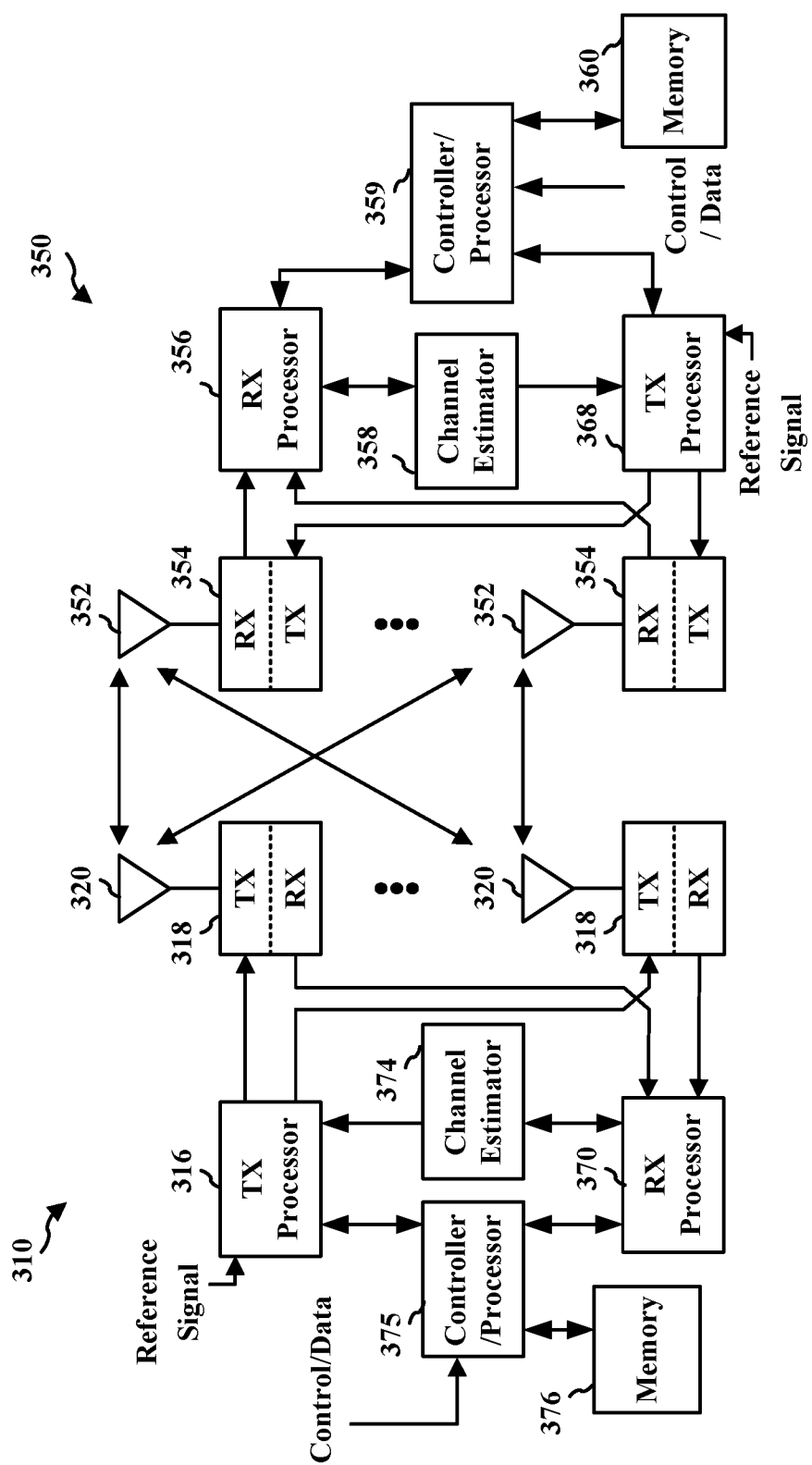
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization. Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some cases, message size for a UE indicating UE capabilities, e.g., for NR communication, may be undesirably large. For example, the message size may exceed a packet size limit. The UE may be limited in its ability to express UE capability for requested band combinations from operators and original equipment manufacturers (OEMs). New band combinations may be continuously defined, some of which may be inadvertently expressed by previously deployed UEs. Configurations for UE capabilities may be over reported, leading to testing for configurations that an operator did not request and which network vendors might not support. At a network, determining a UE's capabilities may require exhaustive cross multiplications and multi-level recursion.

The present application provides solutions that may mitigate or avoid the above challenges for the communication of UE capabilities. The solutions may reduce and manage the size of UE categories and the required processing for a UE to indicate capabilities and/or for a network to determine the UE's capability.

A mechanism may be provided for the query of bands and may also involve a split of the indication regarding UE capability into two indications, e.g., (1) baseband capabilities and (2) RF capabilities.

Baseband capabilities may be referred to as Baseband Processing Capability (BPC) and may include:
1. Bandwidth class information and MIMO; and
2. Potential numerology and other capabilities not dependent on an RF band.

RF capabilities may be divided into groups, e.g., including:
1. Per band capabilities (e.g., including MIMO); and
2. Per band combination capability.

To reconstruct the UE's capability based on these two indications of BPC and RF capability, the network may be required to bridge the BPC and RF capability, e.g., using a bandwidth class.

For NR standalone, a given BPC may be applicable in band combinations of bands 1) with equal bandwidth class, and 2) equal or higher MIMO layer capability. This applicability rule may also apply to fallback combinations which may not be signalled. A "reduced" MIMO capability can be provided in BPC. Additionally, a MIMO restriction may be indicated on a subset of bands, regardless of whether there are additional bands in the configured band combination.

Figure 4:
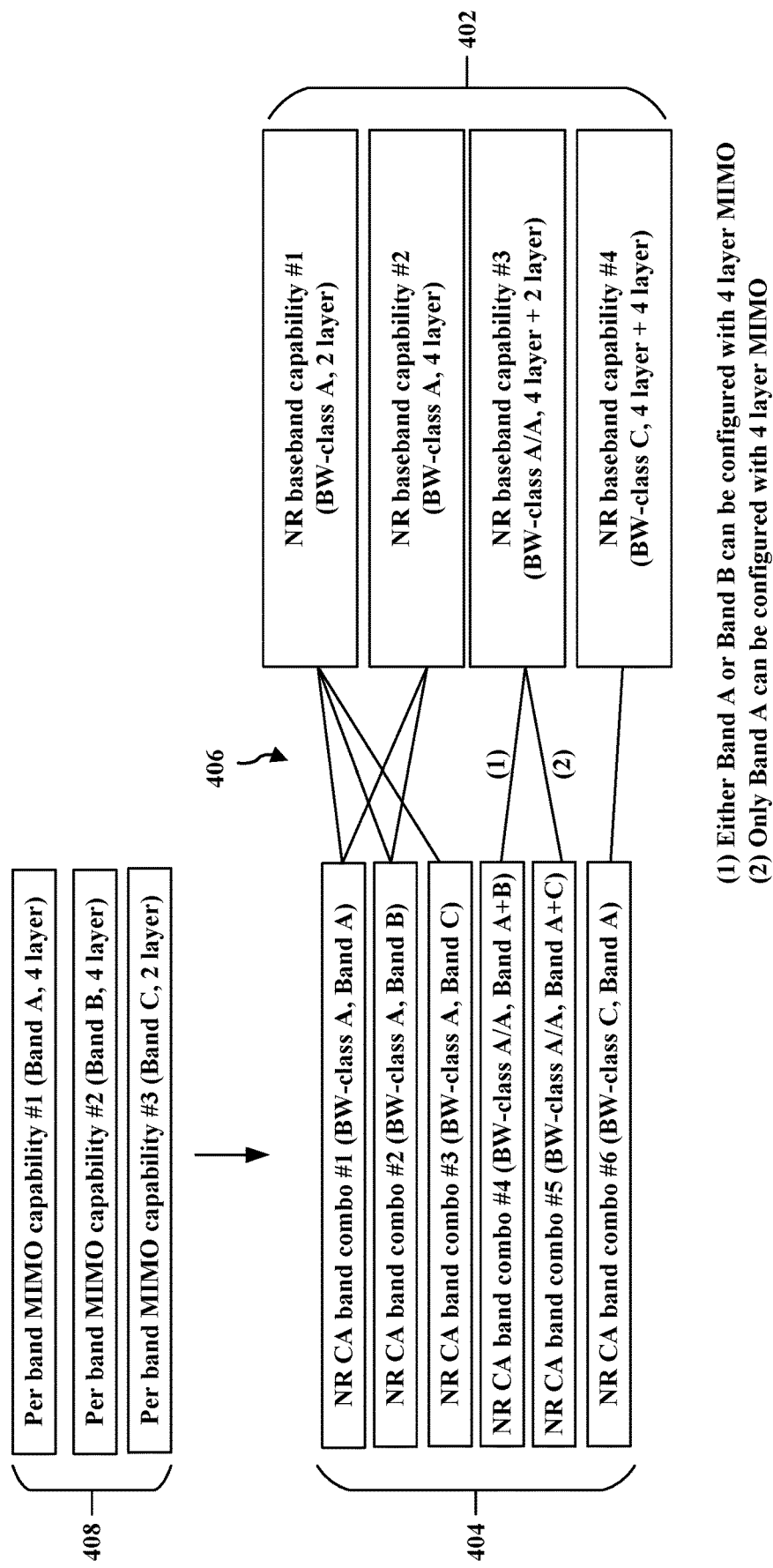
FIG. 4 is a diagram of an example of UE capability signaling.

FIG. 4 illustrates an example of BPC indications 402 and RF capability indications 404 that may be sent by a UE to the network. FIG. 4 also illustrates RB capability 408 per band, whereas RF capability 404 may be per band combination. FIG. 4 illustrates the different information that may be provided by the RF capability indications 404 and the BPC indications 402. FIG. 1 also illustrates the bridges 406 that need to be derived between the two indications 402, 404 for the network to determine UE capability. Thus, the network is required to combine the information in the different types of indications, e.g., 402, 404, to derive a UE capability. The combination may be based on a bandwidth class. Thus, a bandwidth class A in a BPC indication 402 may be connected to various RF capability indications 404 that also correspond to bandwidth class A. However, BPC indications 402 do not include layer and numerology information. Thus, the information provided by the two types of indications is not directly in line with the UE capability information needed by the network and/or the testing of UE capability.

There are a number of potential challenges. First, a UE might not be able to limit the expression of its capabilities to exactly the request band combinations from the operators and OEMs. Additionally, new band combinations may continue to be defined, some of which may have been expressed inadvertently by already deployed UEs.

Three example Carrier Aggregation (CA) combination configurations may include:

CA combination 1
   n1; DL-BCL=a, #DL Layers=2, with UL-BCL=a, with some other baseband parameters (obp0)
   n2; DL-BCL=c, #DL Layers=4, without uplink, with some other baseband parameters (obp1)

CA combination 2
   n3; DL-BCL=a, #DL Layers=4, with UL-BCL=a, with the other baseband parameters (obp1)
   n4, DL-BCL=a, #DL Layers=2, without uplink, with the other baseband parameters (obp0)
   n5, DL-BCL=c, #DL Layers=2, without uplink, with the other baseband parameters (obp0)

Intra-band CA:
   n5, DL-BCL=c, #DL Layers=4, with UL-BCL=a, with the other baseband parameters (obp1)

In the example CA combination configurations, n represents an RF band, e.g., with n1, n2, n3, n4, n5 representing different bands, and BCL indicates a Bandwidth class. DL-BCL corresponds to a downlink BCL, UL-BCL corresponds to an uplink BCL, and #DL Layers corresponds to a number of downlink layers. Thus, CA combination 1 includes band n1 and band n2, each of which has further capabilities.

In these examples, the BPC/RF split according to FIG. 4 would require the BPC information in Table 1 to be signaled, as well as the RF information in Table 2 per band, downlink support of maximum class/layers and the RF information in Table 3, per band combination. As illustrated in the example of Table 1, each baseband combination entry is a list of baseband parameters per band that has the DL and UL MIMO. The BPC information may also include additional information or entries, e.g., obpx in which x is a reference for a specific obp. The entries may further comprise a numerology, detailed bandwidth information, and/or other baseband capabilities that depend on the number of configured carriers. Such capabilities may be (1) per UE; (2) per RF band; (3) per band, per band combination; (4) per cc, per band, per band combination.

TABLE 1

Example BPC Information

| | "Virtual" Band 1 (basebandParametersPerBand) | | | | "Virtual" Band 2 (basebandParametersPerBand) | | | | "Virtual" Band 3 (basebandParametersPerBand) | | | |
|---|---|---|---|---|---|---|---|---|---|---|---|---|
| BPC ID | DL-BCL | #DL Layers | UL-BCL | Other baseband | DL-BCL | #DL Layers | UL-BCL | Other Baseband | DL-BCL | #DL Layers | UL-BCL | Other Baseband |
| 1 | C | 4 | a | obp1 | | | | | | | | |
| 2 | A | 2 | a | obp0 | c | 4 | | obp1 | | | | |
| 3 | A | 4 | a | obp1 | a | 2 | | obp0 | c | 2 | | obp0 |

TABLE 2

RF Information per band, downlink support of maximum class/layers

| Band | DL-Layers |
|---|---|
| n1 | 2 |
| n2 | 4 |
| n3 | 4 |
| n4 | 2 |
| n5 | 4 |

TABLE 3

RF information per band combination

| RF Combination # | RF Band 1 | | | RF Band 2 | | | RF Band 3 | | |
|---|---|---|---|---|---|---|---|---|---|
| | Band | DL-BCL | UL-BCL | Band | DL-BCL | UL-BCL | Band | DL-BCL | UL-BCL |
| 1 | n5 | c | a | | | | | | |
| 2 | n1 | a | a | n2 | c | | | | |
| 3 | n3 | a | a | n4 | a | | n5 | c | |

As a result of the combination of the RF capabilities and the baseband capabilities, the following two additional CA configurations will need to be supported in addition to the original three configurations:

New configuration 1:
 n1; DL-BCL=a; #DL Layers=2; UL-BCL=a; with obp1
 n2; DL-BCL=c; #DL Layers- =2; no uplink, with obp0
New configuration 2:
 N3; DL-BCL=a; #DL Layers=2; UL-BCL=a; with obp0
 N5; DL-BCL=c; #DL Layers=4; no uplink, with obp1

For the first new configuration, the difference compared to what was required by the OEMs/operators for the example configurations is the support of obp1 on n1 and obp0 on n2. That is the opposite of the configuration that was requested in the examples. The difference may involve a numerology switch, a bandwidth combination inversion, or differences in other defined baseband combinations. For the second new configuration, the difference compared to what was required by the OEMs/operators for the example configurations is the support of 4 layers on n5, along with obp1.

For example, when applying such UE capability signaling, a percentage of existing configurations may be over-reported. Thus, testing may be performed for configurations that the operator did not request and that network vendors may not support. Additionally, such signaling may lead to a large percentage of new configurations that would need to be supported, verified, and tested.

Figure 5:
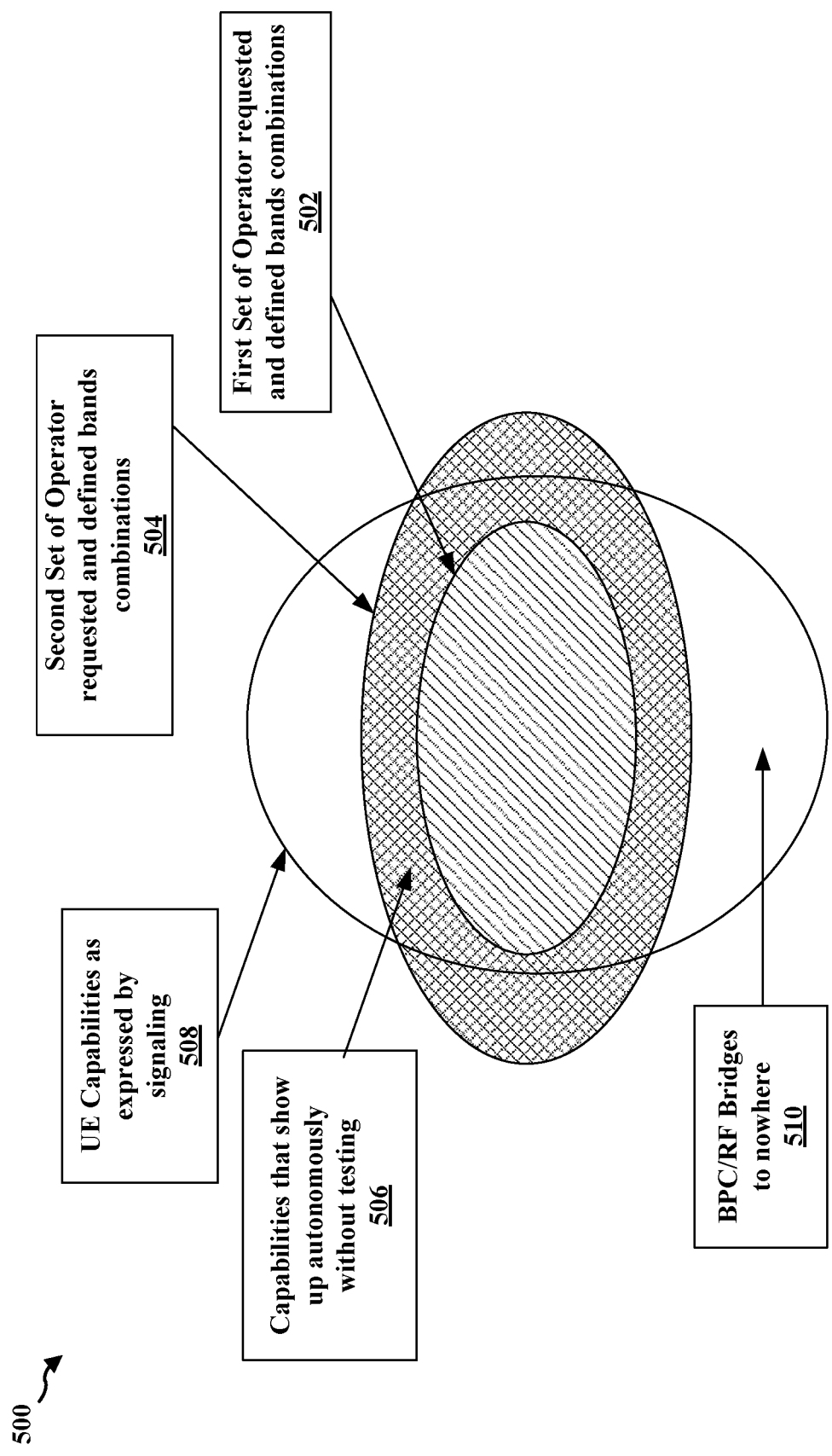
FIG. 5 is a diagram illustrating challenges with UE capability signaling.

FIG. 5 illustrates a graphical representation 500 of the scope of the UE capabilities in correspondence to the UE capability indications. FIG. 5 illustrates different scopes of requested and defined band combinations 502, 504. For example, these may be operator requested and defined band combinations. New band combination subsets may be defined, e.g., targeting markets with different numerologies and layers, but possibly with the same bandwidth class. Capabilities 506 may be autonomous without testing. The UE capabilities, e.g., as expressed by the signaling 508 of the RF indications and BPC indications in the example in FIG. 4 have a different scope than the requested/defined band combinations 502, 504. For example, PBC/RF bridges 510 determined by the network based on the RF capability indications and the BPC indications might correspond to band combinations outside of any operator requested or defined band combinations.

Figure 6:
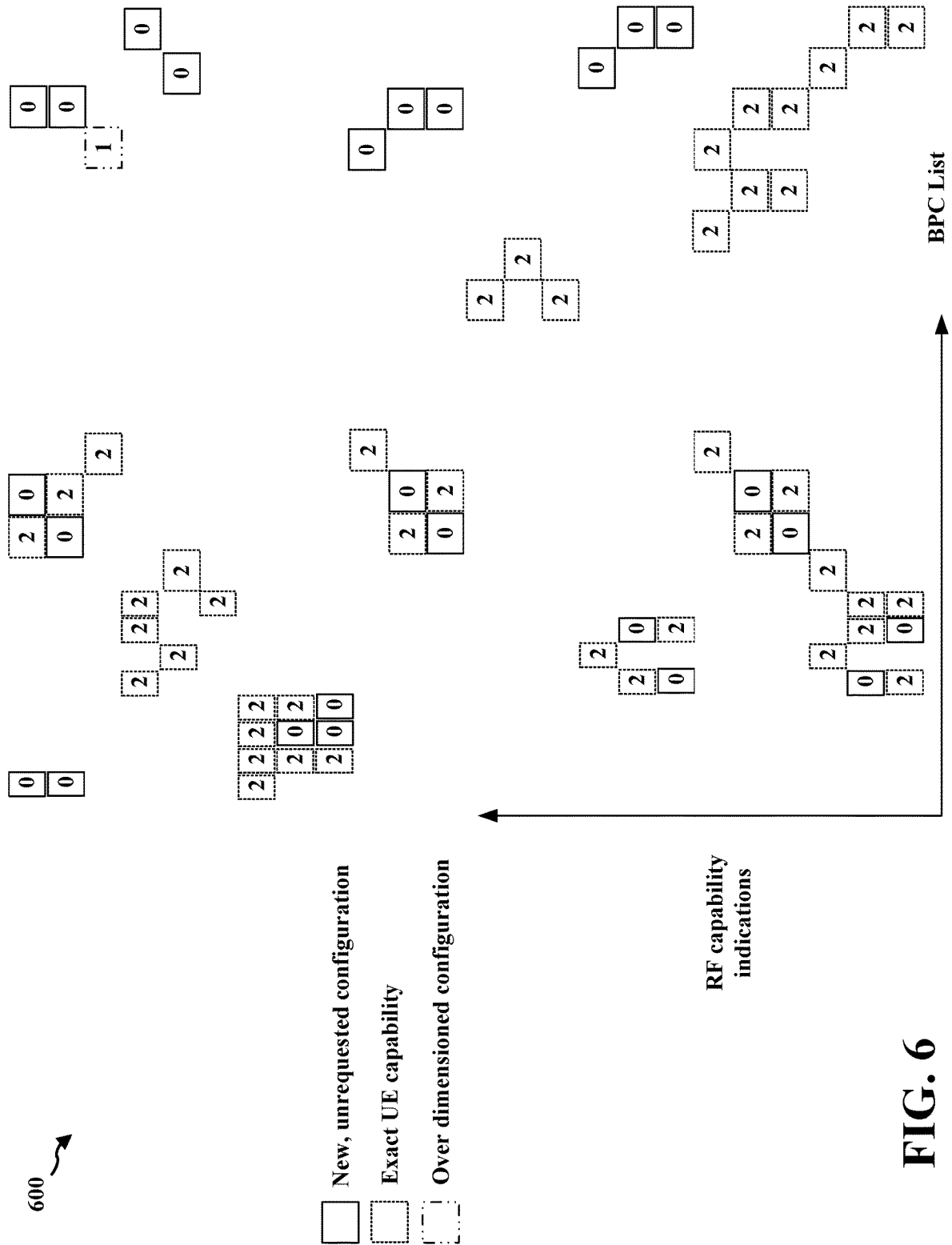
FIG. 6 is an example, partial heatmap regarding UE capability signalling.

FIG. 6 illustrates a partial heatmap 600, showing visually the presence of new unrequested configurations (labelled 0), and over dimensioned configurations (labelled 1). The squares labelled 2 represent exact UE capabilities, in which "exact" means that the reconstructed capability by matching the RF and baseband capabilities would have correctly reconstructed the desired capability intended to be conveyed to the network. The other capabilities may be beyond what was intended to be conveyed to the network. A vertical direction may correspond to different RF capabilities in an RF capability list, and along the horizontal direction may correspond to different BPC in a BPC list. The indicated cells correspond to intersections between the RF capabilities and BPC based on matching bandwidth classes. FIG. 6 illustrates example matches that show up, labelled 0, that were not intended. The RF capability portion may be expressed correctly. However, the BPC portion might not be expressed correctly. Thus, it may become necessary to test and/or support more configurations than intended. The need to test or support unintended configurations due to the manner of reporting RF capabilities and BPC may create a substantial, undesirable burden.

To address the challenges above, changes may be made to reporting of UE capabilities by the UE. The changes may be applicable, e.g., to RAN4 or to RAN2. In one example, an increased number of RF band combinations may be defined and studied. However, such definitions and studies may be unfeasible. With more bands defined, the introduction of any numerology in a certain combination, would require a substantial amount of new studies for all other combinations that match the bandwidth classes combination. In a second example, specifications may become release dependent. However, it may be desirable to maintain release independent specifications. Release dependence may make it difficult for a network to determine a UE's actual capabilities. Release dependence may require the network to refer to historical specifications in order to understand older UE capabilities. This may limit the ability for additional requirements to be defined. While the UE capabilities may be bound to definitions at the time of UE manufacturing, this may lead to inefficiency in the manufacture and operation of UEs and networks. For example, this may lead to unnecessary UE testing for configurations that are not required by any customer.

There is also an added risk to E-UTRA NR Dual Connectivity (EN-DC), which may require the same exercises to be performed for combined LTE/NR capabilities. The same split for the BPC and RF capability indications may be done for LTE as a part of Multi-RAT Dual Connectivity (MR-DC) UE capability. The dependency between LTE BPCs and NR BPCs may be signaled as part of UE capability and comprehended by base stations for the different RATs, e.g., eNB and gNB. The definition of EN-DC baseband capabilities may cause the same reporting challenges discussed above for LTE. Such UE capability reporting may nearly double the amount of additional testing, for the bands supporting EN-DC even when no IoT will be present.

Networks may also be impacted. For example, in order to determine a UE's capability, the network may be required to perform exhaustive cross multiplication of the baseband and RF capabilities, potentially restricted by per band MIMO and layer restrictions, and also potentially by release dates. In order to figure out all of the UE capabilities, the network may need to evaluate a very large number of combinations, which grows in the order of:

$$\sim Cst*N_{BPC}*N_{RF}*\text{FACT}(\text{Number of Carriers})*[(\text{Average Number of L2 constraints})^{N_{Carriers}}*(\text{Average Number of numerology constraints})]^{N_{carriers}}$$

In this calculation, Cst provides a scaling constant, $N_{BPC}$ corresponds to a number of BPC capabilities, $N_{RF}$ corresponds to a number of RF capabilities, and $N_{carriers}$ corresponds to a number of carriers.

Such an evaluation of the combinations may require multi-level recursion for a full list (or many for loops) and may require intricate optimizations to minimize the number of undesired combinations. While the network could save the results once, per type of UE, per area, per requested set of bands, this solution may still require the additional development and constant maintenance of such databases. Table 4 shows the manner in which the number of iterations may grow.

TABLE 4

| Carriers | Numerologies | Constraints | BPC | RF | Number of Iterations |
|---|---|---|---|---|---|
| 1 | 1 | 1 | 1 | 1 | 1 |
| 2 | 1 | 1 | 10 | 20 | 400 |
| 3 | 1.1 | 1.1 | 30 | 50 | 19,292 |
| 4 | 1.1 | 1.2 | 40 | 100 | 205,785 |
| 5 | 1.1 | 1.3 | 60 | 200 | 3,086,768 |

Thus, there is additional work for the network to manage and make sense of the capability structure as described in connection with FIG. 4:

In order to avoid UE capability signaling from leading to UEs being built and tested for configurations that are not requested by network operators and to improve the size of the UE capability information, at least one of the following solutions may be applied.

As a first potential solution, signaling may be defined that allows the UE to signal exact capabilities meant to be deployed by the network operator, without being dependent on a particular version of a specification. This example may be applied regardless of a definition of BCS.

As a second potential solution, a BCS—Bandwidth Combination Set may be used for NR per RF Band combination, and may include Layers and numerology considerations added to the bandwidth class definition or to the BCS definitions.

As an example, the UE may report UE capabilities per adjacent Component Carrier (CC), per virtual band, and/or per virtual band combination. The RF capabilities may be indicated per band per band combination, and may reference the reported UE capabilities.

The triplet (Bandwidth, Numerology, Number of layers) is crucial in defining the UE's envelop. Thus, the UE signaling may indicate the supported bandwidths, layers and numerologies per RF band per RF band combination. As another example, information about layers, numerology, and other potential parameters may be added to a bandwidth class definition, and a bandwidth combination set (BCS) may be reported per RF band combination. As yet another example, the BCS may be reported per RF band combination, and information about layers, numerology, and other potential parameters may be added to the BCS definition.

UE Explicit Signaling

In an example for explicit UE capability signaling, the UE may define "baseband capabilities for adjacent carriers within a band", and may references these definitions in the RF capabilities, per band, per band combination. The UE may list a "list of bandwidths" (bwi) associated with a modulation and subcarrier spacing. Then, the UE can reference these building blocks from the RF capabilities. Thus, the UE may signal two indications, i.e., an RF capability indication and a BPC indication. The BPC indication may include at least one baseband that indicates a numerology, a layer, and a bandwidth. Each baseband may have a corresponding baseband ID. Then, the UE may indicate RF support for a particular baseband RF combination using the baseband ID, as defined by the UE in the BPC.

For example, for each RF band combination, the RF capability signaling may be signaled per band combination. For each RF band combination, the RF capability signaling may indicate a list of downlink baseband configuration IDs, a per band and per downlink band combination, and/or a per band and per uplink band combination. The per band and per downlink band combination may indicate a band number, a reference to a list of supported uplink band combinations, and/or a BCS. The per band, per downlink band combination may include intra-band non-contiguous combinations. On a per band basis and a per uplink band combination basis, the RF capability signaling may indicate a list of uplink baseband configuration IDs, as well as other information. The RF capability signaling may indicate, in a per RF band manner, or group of bands manner, downlink band number(s), a maximum aggregate downlink bandwidth, and/or a maximum number of layers on the downlink. The RF capability signaling may indicate, in a per RF band manner, or group of bands manner, an uplink band number(s), a maximum aggregate uplink bandwidth, and/or a maximum number of layers on the uplink.

Thus, for each RF band combination, the RF capability signaling may include:
 Per RF band combination
  List of DL baseband configuration IDs
  Per band per DL band combination, including intra-band non-contiguous:
   Band number
   Reference to a List of supported uplink band combinations
   BCS
  Per band per UL band combination:
   List of UL baseband configuration IDs
   . . .
 Per RF band, or group of bands (repeat entries allowed):
  Downlink Band number(s)
  Maximum Aggregate DL Bandwidth
  Maximum Number of Layers on the downlink
 Per RF band, or group of bands (repeat entries allowed):
  Uplink Band number(s)
  Maximum Aggregate UL Bandwidth
  Maximum Number of Layers on the uplink
 For (virtual) band (referenced for RF)
  DL baseband configuration ID (may include implicit or explicit numbering)
  Scaling factor
  Per virtual Band
   Per Carrier per virtual band (B)
    Numerology
    DL-Bandwidth
    Maximum number of layers
    Maximum modulation order
    Scaling factor?
    UL Baseband configuration IDs
     Bandwidths, Max number of layers, . . .
 . . .

A virtual band may correspond to a baseband having both RF and baseband capabilities expressed. Different RF bands can be associated with the virtual band capability. Similarly, a virtual band combination may correspond to a band combination having both RF and baseband capabilities expressed and a virtual CC may correspond to a CC having RF and baseband capabilities expressed.

Figure 12:
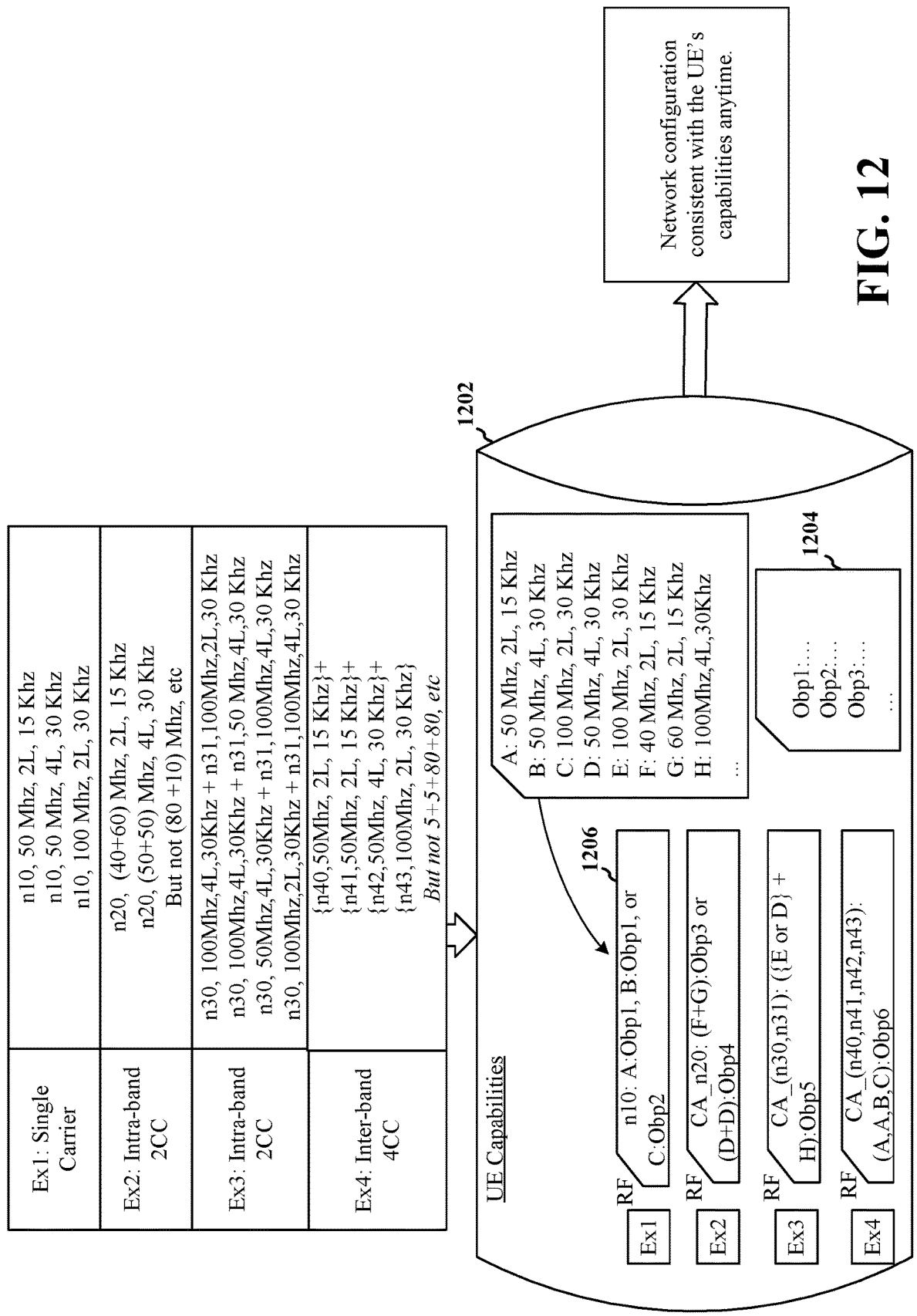
FIG. 12 illustrates an example of UE capability signaling.

FIG. 12 illustrates an example of UE capability signaling 1202 based on these aspects. The UE capability signaling may include RF capability signaling 1206 and other bandwidth parameter signaling 1204. The other bandwidth parameter signaling 1204 may indicate other parameters that are common across at least certain frequencies. These parameters may be referred to as other baseband parameters (obp).

UE capabilities may be grouped into different types. Different types of UE capabilities may be reported in a different manner, e.g., using any of a per UE basis; a per band basis; a per band combination basis; a per band, per band combination basis; or a per CC, per band per band combination basis.

This solution may be comparable in size to the signaling described in connection with FIG. 4. However, instead of having a bandwidth class in both the RF capability indications 404 and the BPC 402, an index of obp, as in FIG. 12, or BPC, as in FIG. 7, may be used in the RF capability indication. This enables the UE to express exactly the capabilities that it supports and enables the network to easily determine which configurations are allowed without having to cross-reference multiple tables.

Baseband Included in a Bandwidth Class

Figure 7:
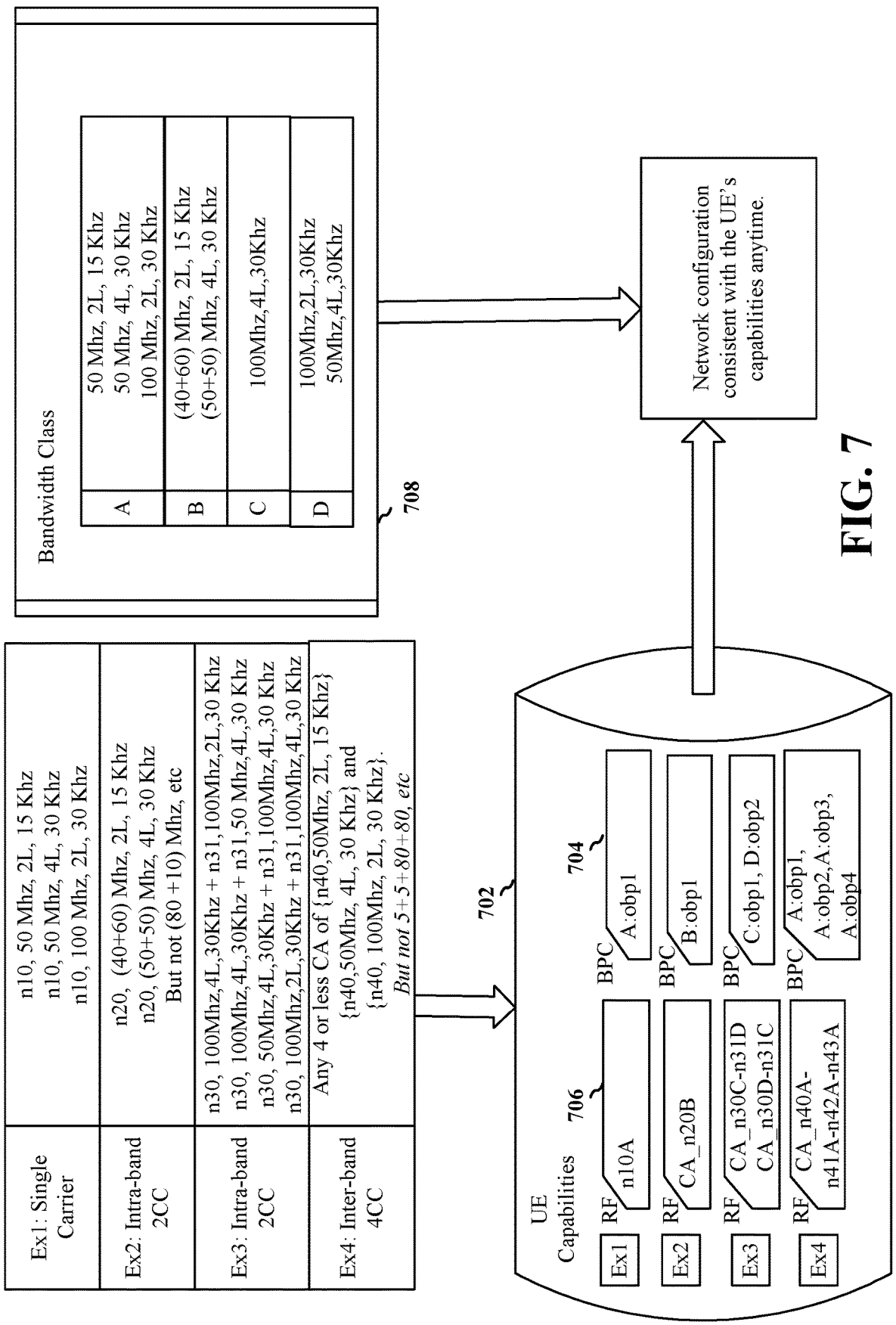
FIG. 7 illustrates an example of UE capability signaling having defined basebands.

Additional granularity may be needed, e.g., in an NR CA combination table, to capture baseband limitations when combining different component carriers. In another aspect, a baseband class may be defined in conjunction with a baseband, e.g., by a network. Multiple abilities may be grouped together. Then, the UE may merely reference the previously defined basebands in the UE capability signaling. This may reduce the amount of signaling required by the UE. FIG. 7 illustrates a list of example, basebands (A, B, C) that may be defined, e.g., in a standard or otherwise. Each baseband has a bandwidth, a numerology, and a layer. The UE may signal UE capabilities, including both BPC and RF capability indications. FIG. 7 illustrates an example in which the UE signals UE capabilities 702 that includes indication(s) of RF capabilities 706 and indication(s) of BPC 704. The BPC, for example, references the defined bandwidth classes 708. As illustrated in FIG. 7, the BPC capabilities may reference an obp. The obp may correspond to parameters that are different than the bandwidth, layer, and numerology information that is indicated by reference to a bandwidth class 708.

Figure 13:
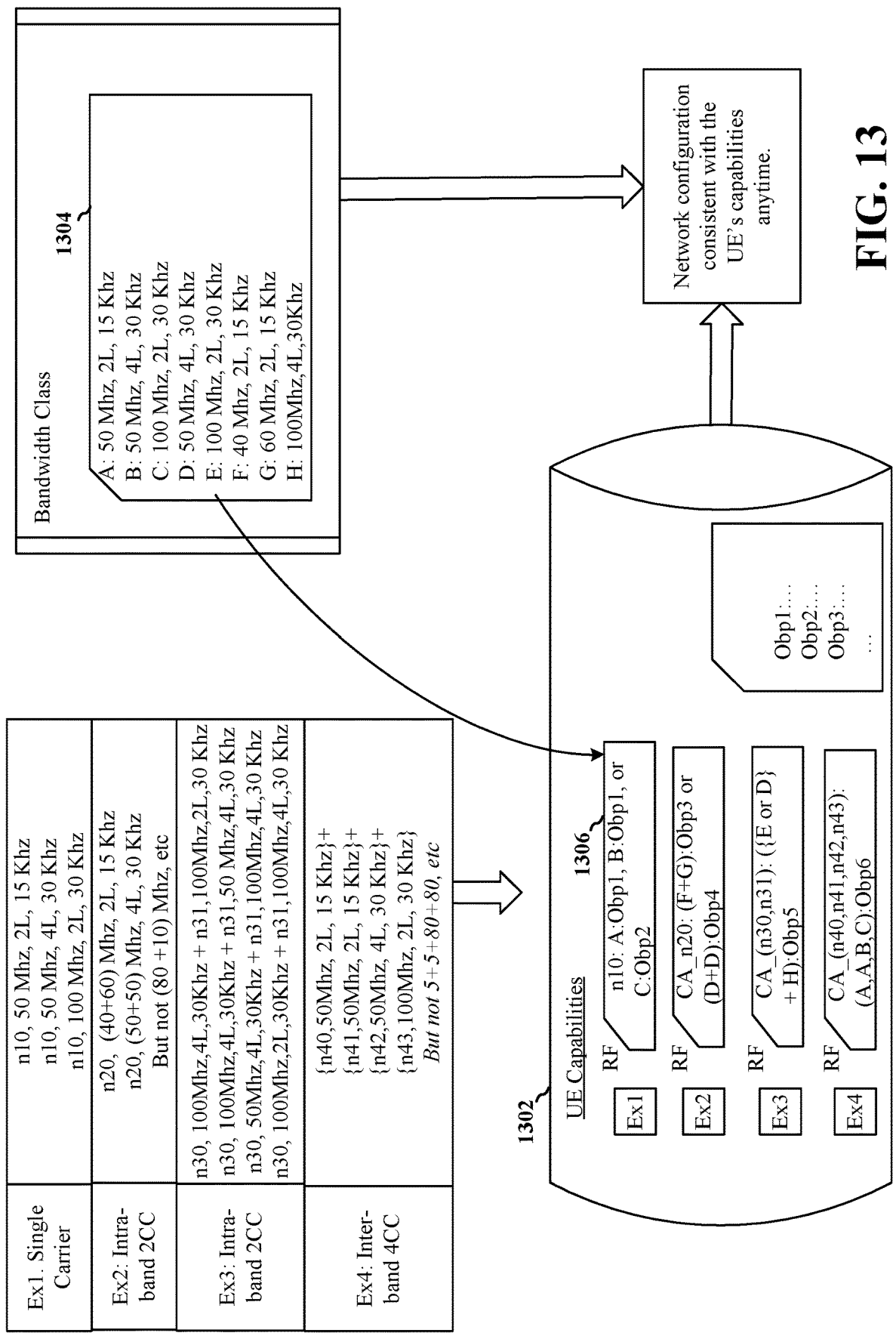
FIG. 13 illustrates an example of UE capability signaling.

FIG. 13 illustrates an example in which a Bandwidth Combination Set (BCS) may be specified for NR per RF Band combination. In addition, layers, numerologies and potentially other parameters may be added to the bandwidth class definition. FIG. 13 illustrates an example of such UE capability signaling 1302 in which the UE capabilities 1306 may be indicated with reference to a bandwidth class from a set of bandwidth classes 1304. As illustrated at 1304, the bandwidth class may include layers, numerologies, and other parameters for the bandwidth classes.

Baseband Included in a BCS

Figure 8:
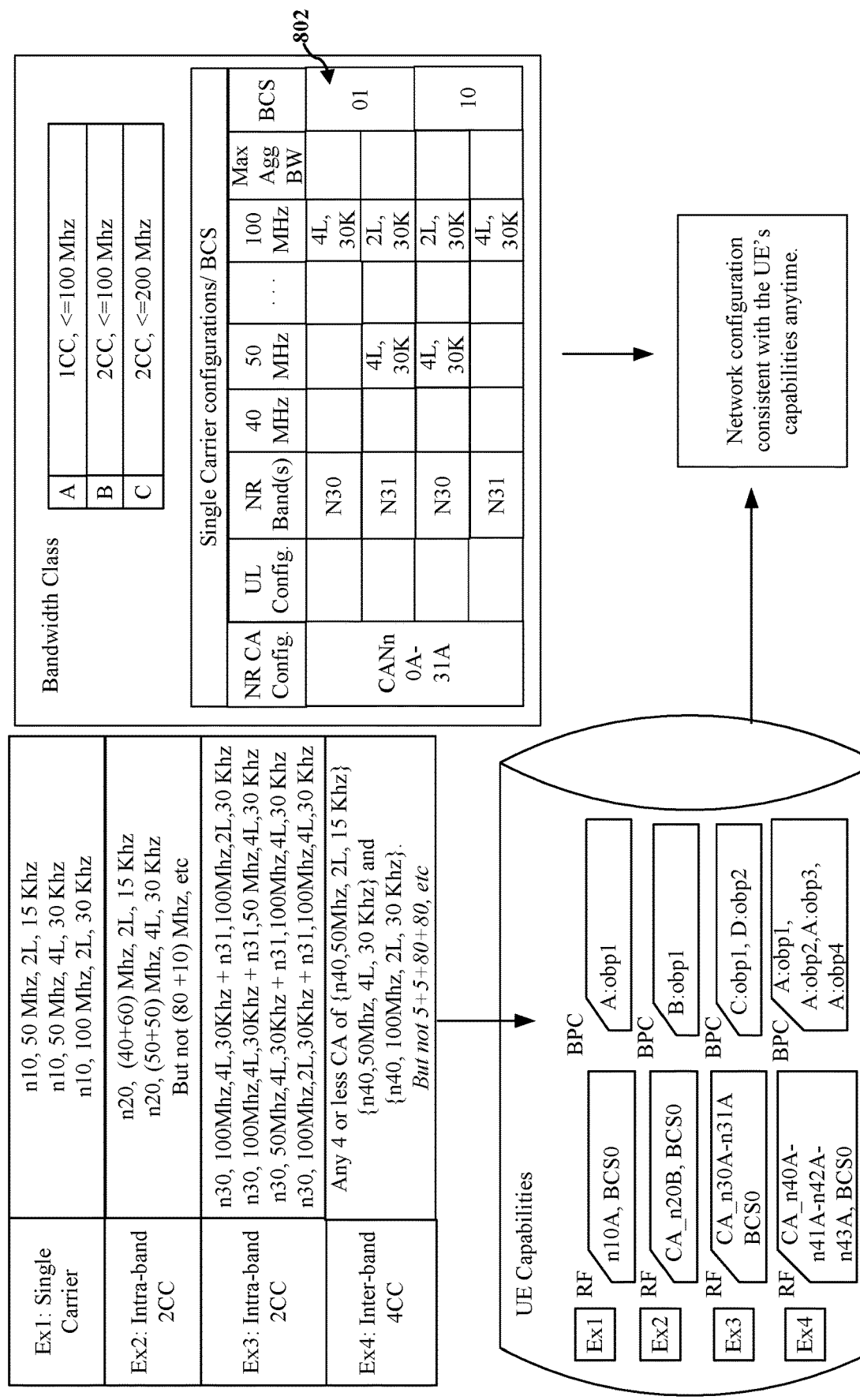
FIG. 8 illustrates an example of UE capability signaling having defined basebands.
Figure 14:
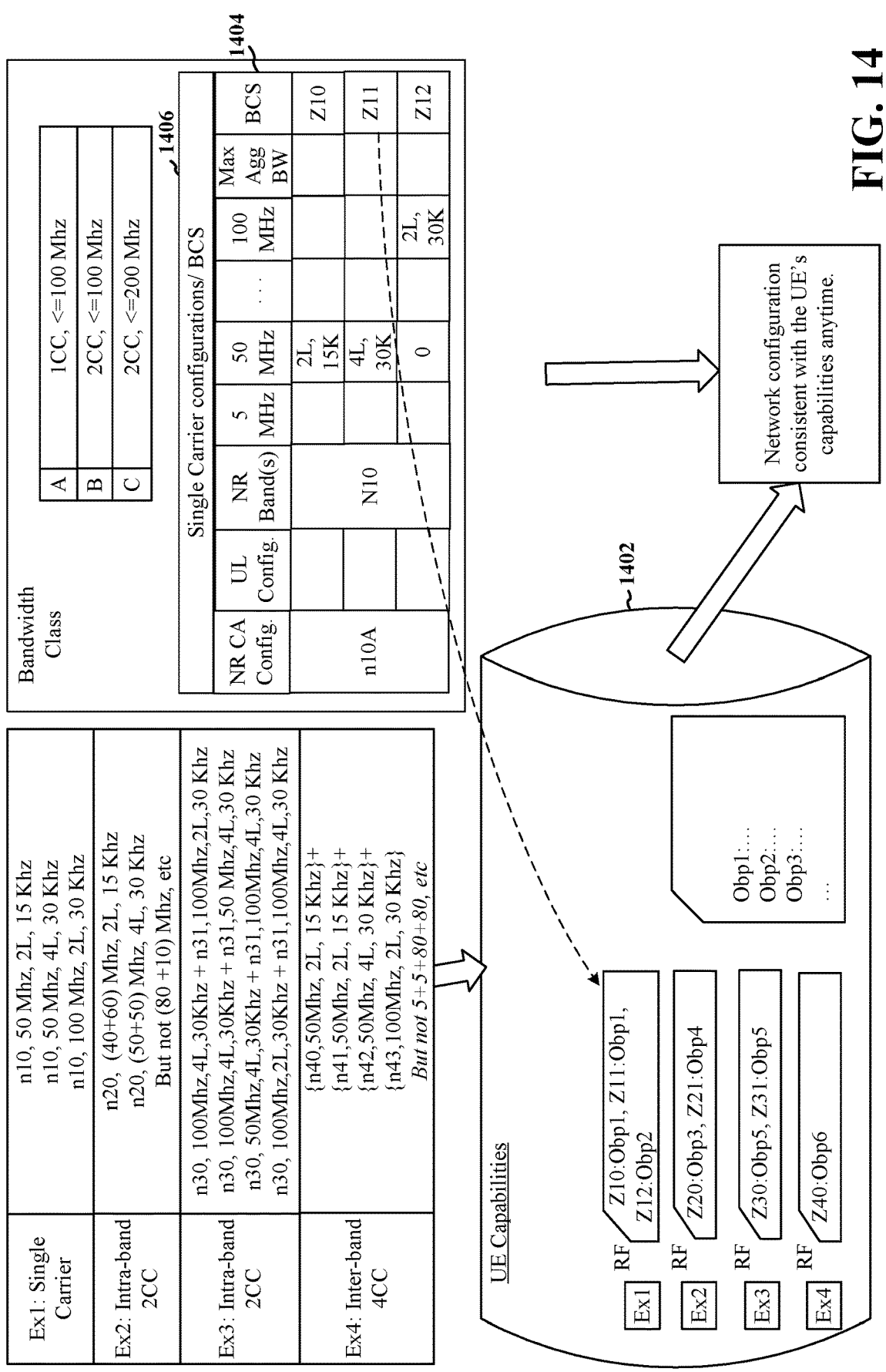
FIG. 14 illustrates an example of UE capability signaling.

In another example, bandwidth class might not be based on baseband, and each CA configuration may define a BCS in terms of layers and numerologies that are expected to be supported, e.g., as illustrated in the example in FIG. 14. The BCS may be specified per RF Band combination. Layers, numerologies and potentially other parameters may be added to the BCS definition 1406. FIG. 14 illustrates an example of such UE capability signaling 1402. As illustrated at 1404, layers, numerologies, and other parameters may be added to the bandwidth combination set definition 1406. FIG. 14 only illustrates one example of BCS defined in terms of CA configuration. Tables 5-7 illustrate example formats for the defined basebands using a BCS, that may be used, e.g., in FIG. 14. FIG. 8 illustrates another example, similar to FIG. 14, in which the basebands may be defined using a BCS 802.

TABLE 5

| | Single Carrier configuration/Bandwidth combination set | | | | | | | | | |
|---|---|---|---|---|---|---|---|---|---|---|
| NR CA configuration | Uplink configuration | NR Bands | 5 MHz | 40 MHz | 50 MHz | 60 MHz | 80 MHz | 100 MHz | Max agg. BW MHz | BCS |
| n10A | | N10 | | | 2 L, 15K 4 L, 30K | | | | 2 L, 30K | Z10 |

TABLE 6

| | NR CA configuration/Bandwidth combination set | | | | | | | | | |
|---|---|---|---|---|---|---|---|---|---|---|
| NR CA configuration | Uplink CA configurations | NR Bands | 5 MHz | 40 MHz | 50 MHz | 60 MHz | 80 MHz | 100 MHz | Max agg. BW MHz | BCS |
| CAn20B | | N20 | | 2 L, 15K | | | | | | Z20 |
| | | | | | | 2 L, 30K | | | | |
| | | N20 | | | 4 L, 30K 4 L, 30K | | | | | Z21 |
| CAn30A-31A | | N30 | | | | | | 4 L, 30K | | Z30 |
| | | N31 | | 4 L, 30K | | | | 2 L, 30K | | |
| | | N30 | | | 4 L, 30K | | | 2 L, 30K | | Z31 |
| | | N31 | | | | | | 4 L, 30K | | |

TABLE 6-continued

NR CA configuration/Bandwidth combination set

| NR CA configuration | Uplink CA configurations | NR Bands | 5 MHz | 40 MHz | 50 MHz | 60 MHz | 80 MHz | 100 MHz | Max agg. BW MHz | BCS |
|---|---|---|---|---|---|---|---|---|---|---|
| CAn40A-n41A-n42A-n43A | | N40 | | | 2 L, 15K | | | | | Z40 |
| | | N41 | | | 2 L, 15K | | | | | |
| | | N42 | | | 4 L, 30K | | | | | |
| | | N43 | | | | | | 2 L, 30K | | |

TABLE 7

NR CA configuration/Bandwidth combination set

| NR CA Configuration | Uplink CA configuration | NR Bands | 5 MHz | MHz | 50 MHz | 60 MHz | 80 MHz | 100 MHz | Max. agg. BW MHz | BCS |
|---|---|---|---|---|---|---|---|---|---|---|
| CAn1A - n3A | CAn1A- n3A | 1 | | | 30 Khz 4 L | 30 Khz 4 L | 30 Khz 4 L | 30 Khz 2 L | 200 | 0 |
| | | 3 | | | 15 Khz 4 L | 15 Khz 4 L | 15 Khz 4 L | 15 Khz 2 L | | |
| | | 1 | | | 30 Khz 4 L | 30 Khz 4 L | 30 Khz 2 L | 30 Khz 2 L | 200 | 1 |
| | | 3 | | | 15 Khz 4 L | 15 Khz 4 L | 15 Khz 2 L | 15 Khz 2 L | | |
| | | 1 | | | 30 Khz 4 L | 30 Khz 4 L | 30 Khz 2 L | 30 Khz 2 L | 150 | 2 |
| | | 3 | | | 15 Khz 4 L | 15 Khz 4 L | 15 Khz 2 L | 15 Khz 2 L | | |

Thus, UE capability signaling may include an indication of other parameters that are common across RF bands or a group of RF bands. The other parameter creates a capability container that can be common across bands/band configurations. The capability unit can be at a band level or a band combination level. FIGS. 12, 13, and 14 illustrate obp showing a capability at a band combination level. However, the band combinations themselves can point to another set of reference containers at the band level. This may be useful to avoid repetition of a band's capabilities when that band occurs in multiple instances of the band combinations. Indeed, the UE's capabilities in a certain band may remain the same whether that band is used in a band combination with a second band or with a third band. Thus, redundancy can be removed by defining the parameters at the band level, and having two levels of pointers from the RF bands to the band combination parameters, and in turn from the band combination parameters to the band parameters.

Hybrid with Explicit Signaling and Defined Bandwidth Classes

A potential solution may incorporate aspects of both the explicit signaling and the defined bandwidth classes. In this hybrid solution, a UE may define "baseband capabilities for adjacent carriers" and may reference these capabilities in the RF capabilities on a per band, per band combination basis.

The UE may list a list of bandwidths associated with a modulation and subcarrier spacing. Then, the UE can reference these building blocks from the RF capabilities.

Figure 9:
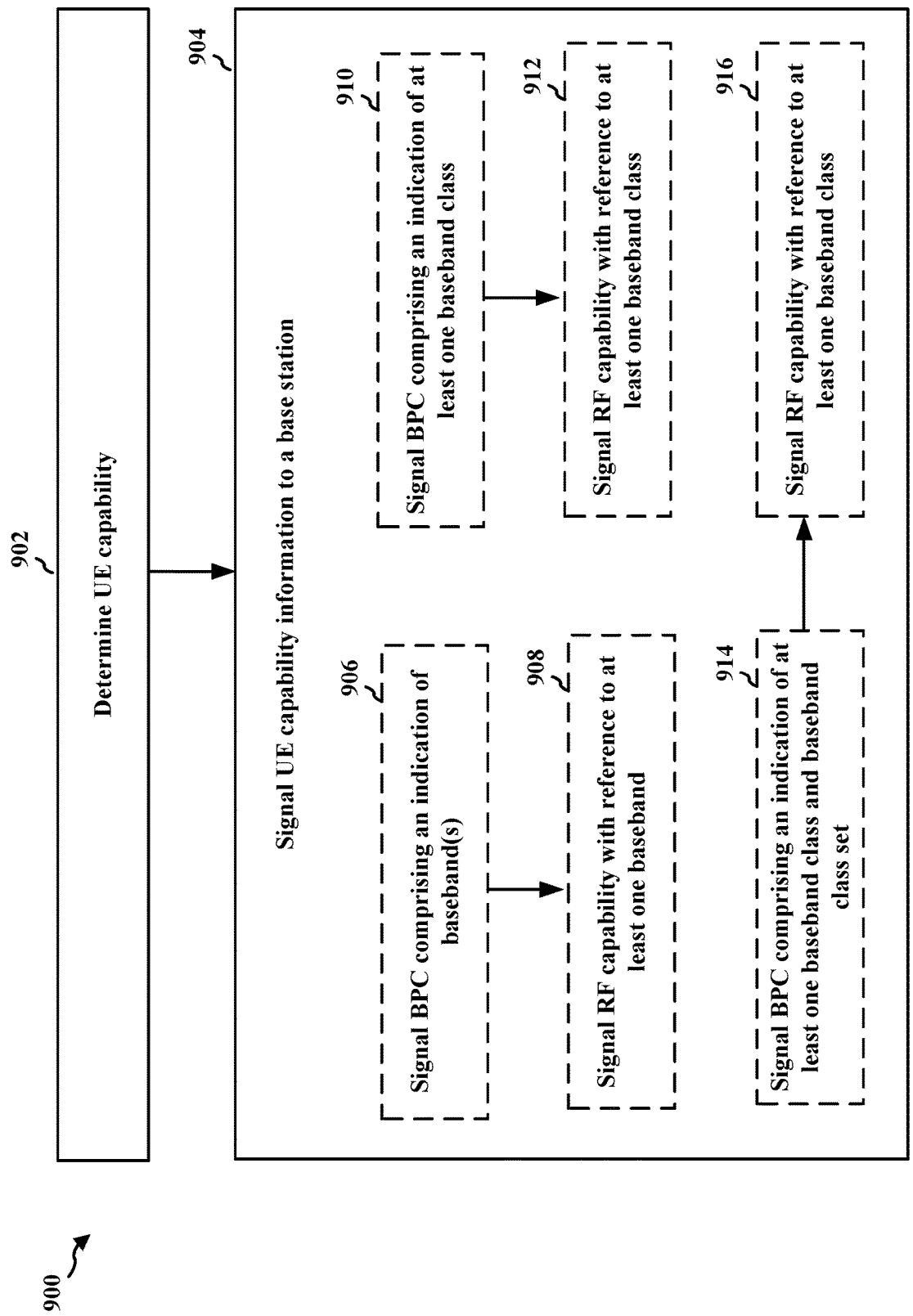
FIG. 9 is a flowchart of a method of wireless communication.

FIG. 9 is a flowchart 900 of a method of wireless communication. The method may be performed by UE (e.g., 104, 350) communicating UE capabilities with base station 1050 (e.g., base station 102, 180, 310). The communication may be based on 5G/NR, for example. At 902, the UE determines UE capability(s), and at 904, the UE signals UE capability information to a base station. The method enables the UE to signal UE capability information in a more efficient and accurate manner that reduces the reporting of unnecessary or ambiguous capability information.

In one example, the UE signals, at 906, BPC information to the base station comprising an indication of at least one baseband and signals, at 908, Radio Frequency capability information to the base station with reference to at least one baseband indicated in the BPC.

The basebands may be determined and defined by a UE. Thus, the BPC may include explicit signaling of the basebands from the UE. In this example, the BPC may comprise at least one baseband explicitly signaled by the UE, wherein each baseband indicates a combination of some or all of a numerology, a layer and a bandwidth. Other parameters may also be indicated in a baseband. The RF capability information may indicate whether the numerology, the layer, and/or the bandwidth comprised in the at least one baseband is supported for a particular RF combination. Each baseband may be signaled with a corresponding baseband identifier (ID), and wherein the RF capability information indicates support for a particular RF band with the corresponding baseband ID. The UE capability information may be signaled without an indication of a bandwidth class.

In another example, the basebands may be previously defined, e.g., by a standard or network, as described in connection with FIGS. 7 and 8. Thus, a plurality of basebands may be defined with each baseband indicating a combination comprising at least one of a numerology, a layer and a bandwidth class. Other parameters may also be indicated in the baseband. The RF capability information may indicate RF capability for one of the defined plurality of baseband classes. Each of the defined baseband comprises a bandwidth combination set identifier, e.g., 802, wherein the RF capability information indicates the RF capability for one of the defined plurality of basebands with reference to the bandwidth combination set identifier.

In another example, the UE capability signaling may rely on a combination of explicit signaling by the UE regarding the basebands and a portion of previously defined baseband information.

In another example, the UE signals BPC information to the base station at 910 comprising an indication of at least one baseband class. At 912, the UE signals RF capability information to the base station with reference to at least one baseband class, wherein the baseband class indicates a combination of some or all of a numerology, a layer and a bandwidth. Other parameters may also be indicated in the baseband class.

In yet another example, the UE signals BPC information to the base station at 914, comprising an indication of at least one baseband class and a baseband class set. At 916, the UE signals RF capability information to the base station with reference to at least one baseband class, wherein the baseband class set indicates a combination of some or all of a numerology, a layer and a bandwidth. Other parameters may also be indicated in the baseband class set.

Figure 15:
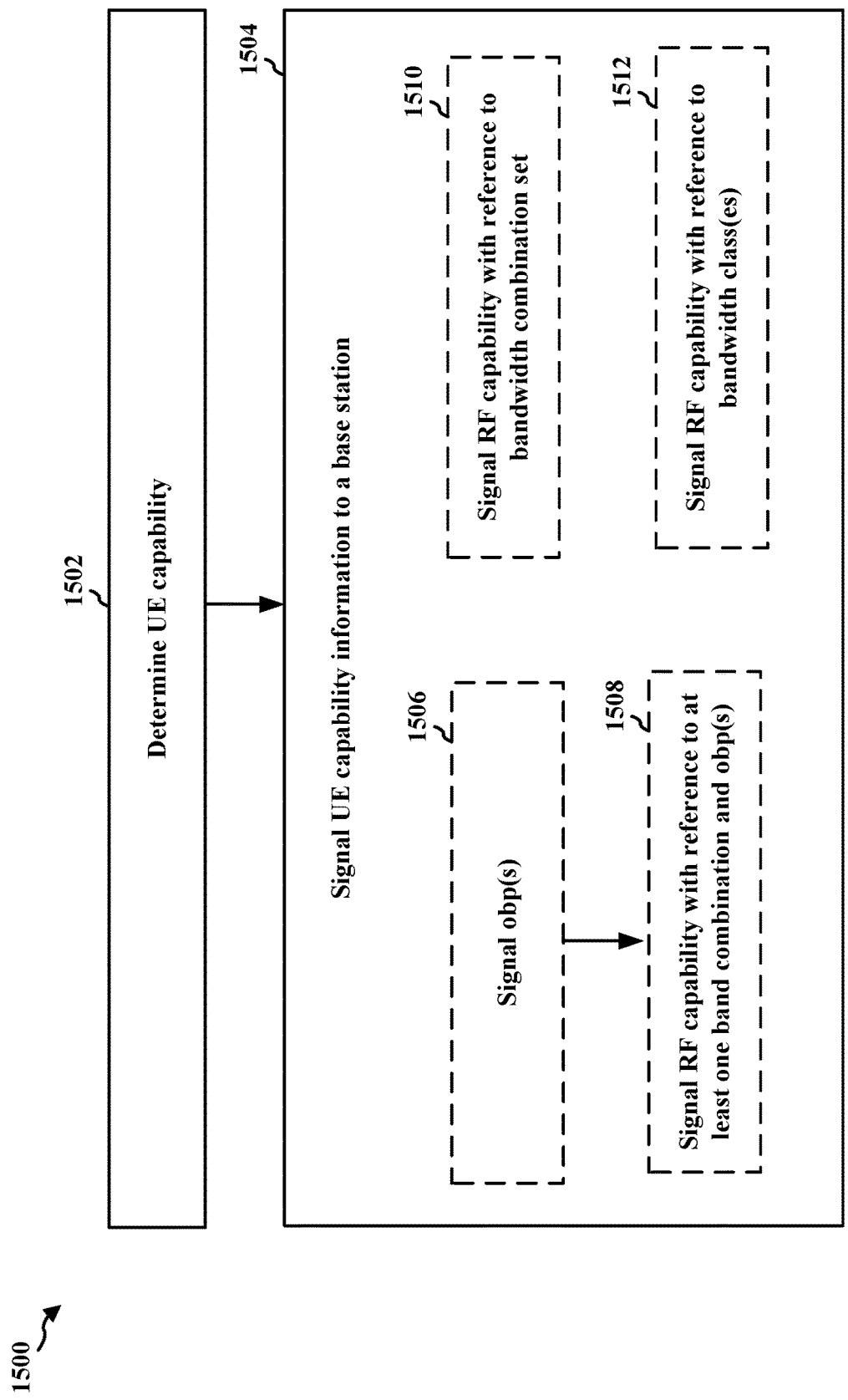
FIG. 15 is a flowchart of a method of wireless communication.

FIG. 15 is a flowchart 1500 of a method of wireless communication. The method may be performed by UE (e.g., 104, 350, the apparatus 1002, 1002') communicating UE capabilities with base station 1050 (e.g., base station 102, 180, 310, 1702, 1702'). The communication may be based on 5G/NR. The method enables the UE to signal UE capability information in a more efficient and accurate manner that reduces the reporting of unnecessary capability information.

At 1502, the UE determines UE capability(s). The UE capabilities may comprise any of the capabilities described in connection with FIGS. 4-8 and 12-14.

At 1504, the UE signals UE capability information to a base station. Various examples have been provided, e.g., in connection with FIGS. 7-8 and 12-14 regarding the manner in which the UE may signal the UE capability information to the base station.

As illustrated at 1506, the UE may signal other baseband parameters (obp), at 1506, as described in connection with any of FIGS. 12-14. An obp indicates feature(s), or sets of features, that are supported by the UE. Such features may be indicated in a list. The term obp is merely an example. Other terms may be used to describe these parameters. For example, the obp may be referred to as a feature set. FIG. 12 illustrates an example obp list, at 1204, that includes a list of obp identifiers, e.g., Obp1, Obp2, Obp3, . . . . Each obp identifier may correspond to a set of parameters or features. Support for the obp(s) may be indicated per band, e.g., using an ID, which may be referred to as the corresponding obp ID(s). Support for obp(s) may be indicated per CC. Support for such CC parameters may be indicated using an ID, e.g., the corresponding obp ID(s). In another example, the support for the obp(s) may be indicated per band and per CC, e.g., depending on the parameters. Thus, support for certain obp parameters may be indicated on a per band, per CC basis, whereas support for others may be indicated using a different basis. Support for obp parameters may be indicated on a per band, per CC basis using the corresponding obp ID(s).

Then, at 1508, the UE may signal RF capability information to the base station with reference to at least one band combination and with reference to at least one obp parameter. Support for obp(s) may be indicated in the RF capability information using an obp ID. FIG. 12 illustrates RF capability information 1206 being indicated using the obp IDs from the obp list 1204. FIG. 12 illustrates examples of RF capability information 1206 for band combinations. Other terms may be used for the "RF capability information." For example, as the RF capability information is indicated with reference to band combinations, the RF capability information may be described as band combination information. Each defined band combination may comprise a bandwidth combination set identifier, wherein the RF capability information indicates the RF capability for one of the defined plurality of basebands with reference to the bandwidth combination set identifier. The obp(s) may be common across multiple RF bands. Each band combination may indicate a combination comprising at least one of a numerology, a layer, or a bandwidth. The RF capability information may indicate whether the numerology, the layer, and the bandwidth comprised is supported for a particular band combination. The obp(s) may indicate other parameters than bandwidth, layers, and numerology. Examples of such capabilities/parameters that may be indicated as an obp include, among others, EUTRA capability information, NR capability information, intraband frequency separation information, scaling factor information, cross carrier scheduling information, support for SCell without SSB, control channel monitoring occasions, UE specific UL-DL assignment information, search space sharing information for CA, a time duration for QCL, PDSCH or PUSCH processing information, DMRS information, subcarrier spacing information, supported DL bandwidth, supported UL bandwidth, channel bandwidth information, MIMO layer information for PDSCH or PUSCH, modulation order information, SRS resource information, SUL information, simultaneous transmission information, etc.

As illustrated at 1510, the UE may signal the RF capability information to the base station with reference to a bandwidth combination set (BCS), e.g., as described in connection with FIG. 14. The BCS may correspond to a combination of a numerology, a bandwidth, and/or a layer. The bandwidth combination set may correspond to a combination of at least two of a numerology, a bandwidth, and/or a layer. The bandwidth combination set may correspond to a combination of a numerology, a bandwidth, and a layer.

As illustrated at 1512, the UE may signal the RF capability information to the base station with reference to a bandwidth class, e.g., as described in connection with FIG. 13 or 14. The bandwidth class may correspond to a combination of a numerology, a bandwidth, and/or a layer. The bandwidth class may correspond to a combination of at least two of a numerology, a bandwidth, and/or a layer. The bandwidth class may correspond to a combination of a numerology, a bandwidth, and a layer. In other examples, the UE may signal the UE capability information without an indication of a bandwidth class.

Figure 10:
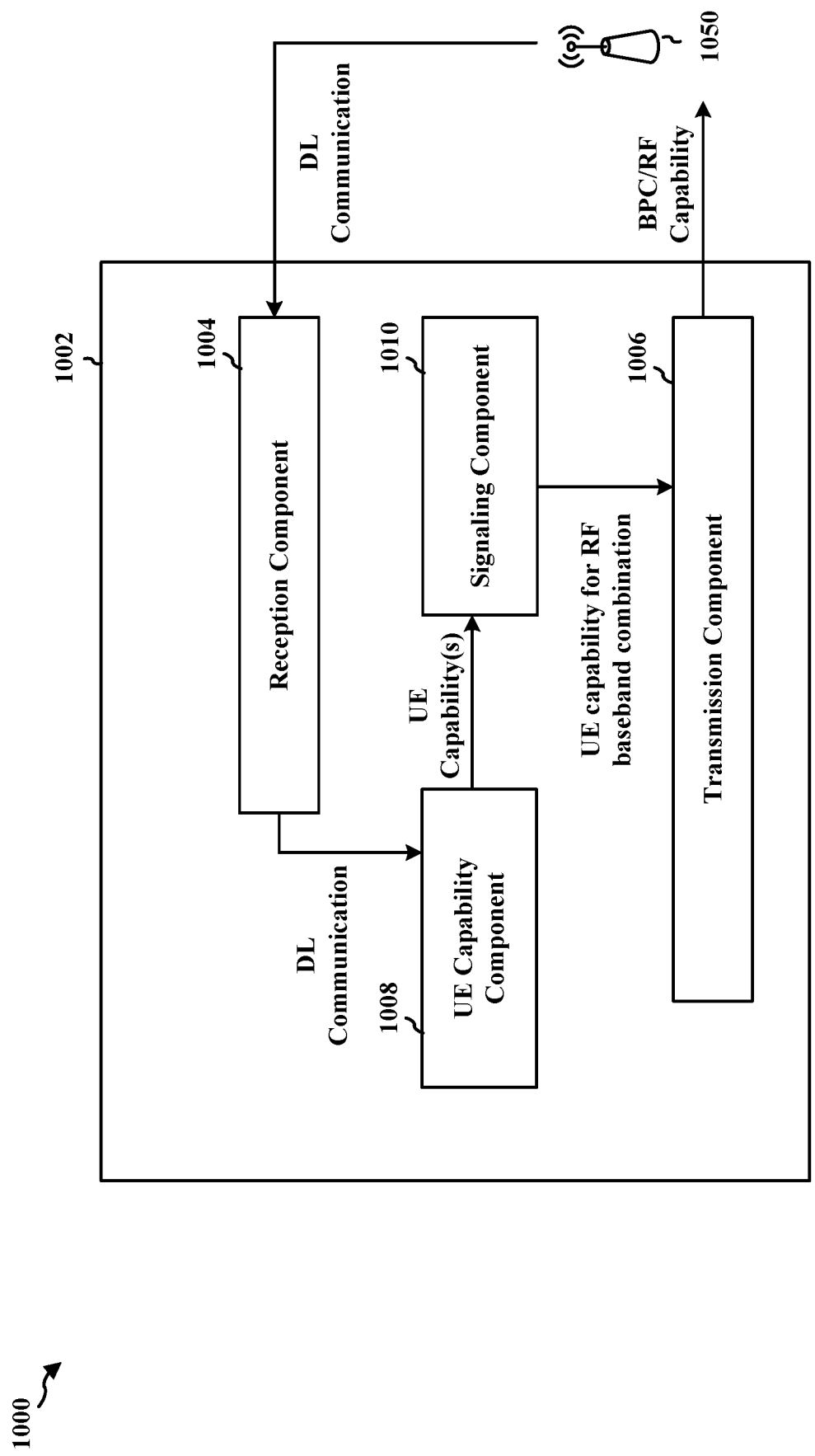
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE (e.g., 104, 350) communicating UE capabilities with base station 1050 (e.g., base station 102, 180, 310). The communication may be based on 5G/NR. The apparatus includes a reception component 1004 that receives downlink communication from the base station and a transmission component 1006 that transmits uplink communication to the base station including UE capability information. The apparatus may include a UE capability component 1008 configured to determine UE capability(s), e.g., as described in connection with 902 or 1502. The apparatus may include a signaling component 1010 configured to signal UE capability information to a base station, e.g., as described in connection with 904 or 1504. The signaling may include BPC information to the base station comprising an indication of at least one baseband and Radio Frequency capability information to the base station with reference to at least one baseband indicated in the BPC, as described in connection with FIGS. 7, 8, and 9. The UE capability information may be signaled using a baseband explicitly signaled to the base station and/or a baseband definition, wherein each baseband indicates a combination of a numerology, a layer, and a bandwidth. The signaling from signaling component 1010 may include other band combination parameters, bandwidth class(es), and/or bandwidth combination set(s) as described in connection with FIGS. 12-15. Thus, the signaling component may be configured to signal RF capability information to the base station with reference to at least one band combination and to signal obp parameters to the base station. The RF capability information may indicate RF capability with reference to at least one other band combination parameter, e.g., as described in connection with at least FIGS. 12 and 15.

The apparatus may include additional components that perform each of the blocks of the algorithm in the aforementioned flowcharts of FIGS. 9 and 15. As such, each block in the aforementioned flowcharts of FIGS. 9 and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
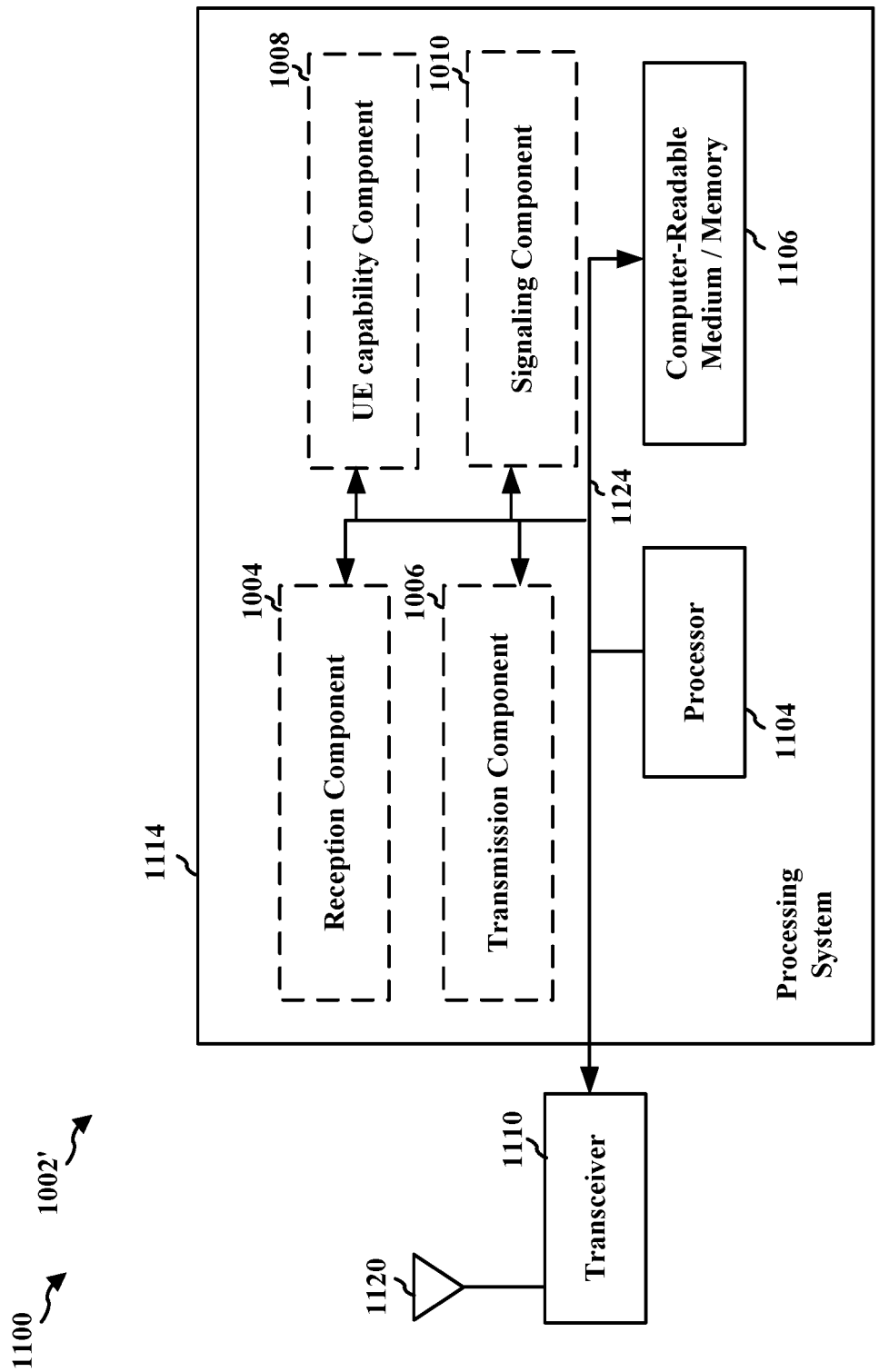
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for determining UE capability and means for signaling UE capability information. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 16:
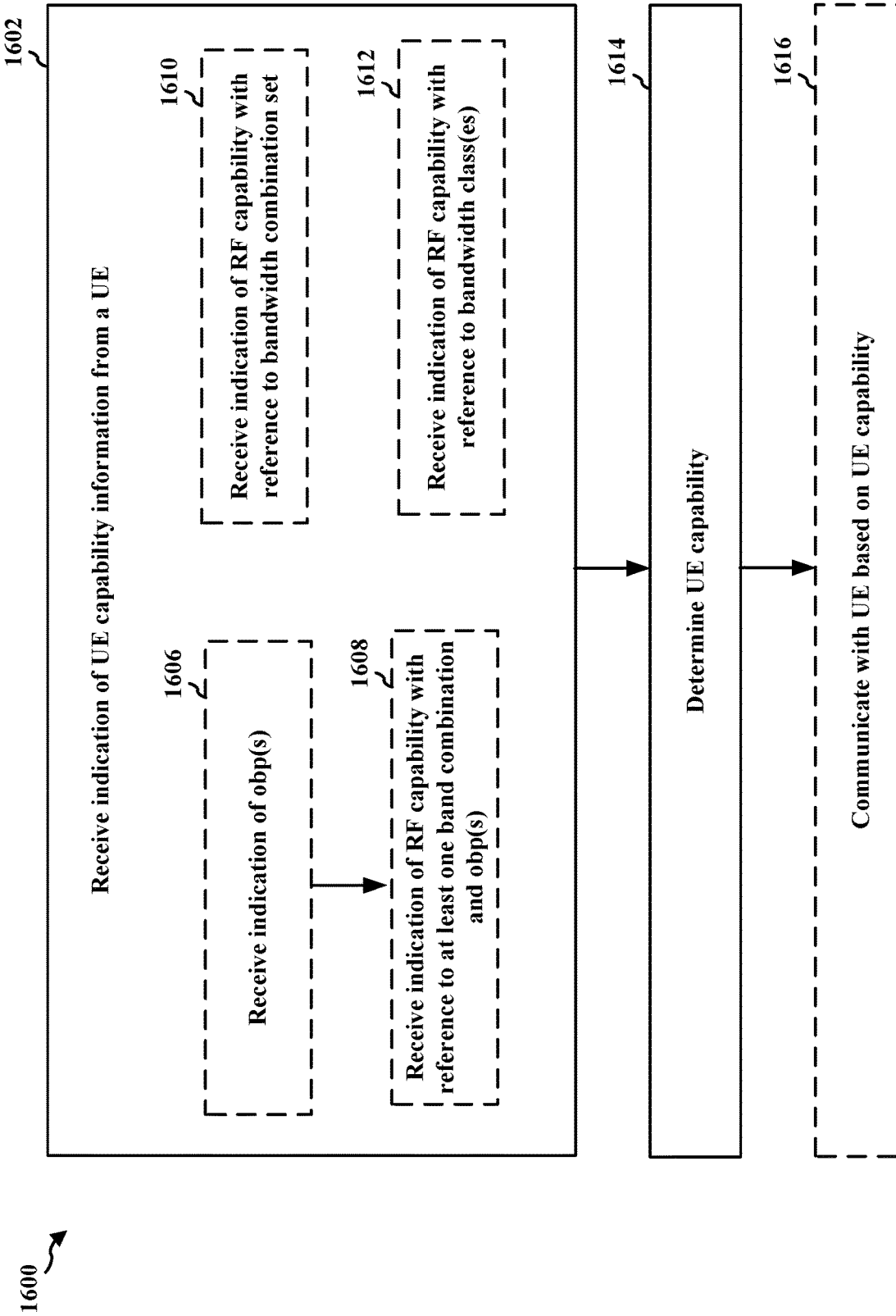
FIG. 16 is a flowchart of a method of wireless communication.

FIG. 16 is a flowchart 1600 of a method of wireless communication. The method may be performed by base station (e.g., 102, 180, 310, 1050, the apparatus 1702, 1702') that receives indication(s) of UE capabilities with from a UE (e.g., UE 104, 350, the apparatus 1002, 1002'). The communication may be based on NR, e.g., 5G/NR. The method enables the base station to receive signaling of UE capability information in a more efficient and accurate manner that reduces the reporting of unnecessary capability information.

At 1602, the base station receives signaling from a UE that signals UE capability information to the base station. Various examples of such signaling have been provided, e.g., in connection with FIGS. 7-9 and 12-15 regarding the manner in which the UE may signal the UE capability information to the base station.

As illustrated at 1606, the base station may receive, from the UE, an indication of other baseband parameters (obp), as described in connection with any of FIGS. 12-14. An obp indicates feature(s), or sets of features, that are supported by the UE. Such features may be indicated in a list. The term obp is merely an example. Other terms may be used to describe these parameters. For example, the obp may be referred to as a feature set. FIG. 12 illustrates an example obp list, at 1204, that includes a list of obp identifiers, e.g., Obp1, Obp2, Obp3, . . . . Each obp identifier may correspond to a set of parameters or features. The UE's support for the obp(s) may be indicated to the base station per band, e.g., using an ID, which may be referred to as the corresponding obp ID(s). The UE's support for obp(s) may be indicated to the base station per CC. The UE's support for such CC parameters may be indicated to the base station using an ID, e.g., the corresponding obp ID(s). In another example, the UE's support for the obp(s) may be indicated to the base station per band and per CC, e.g., depending on the parameters. Thus, support for certain obp parameters may be indicated to the base station on a per band, per CC basis, whereas support for others may be indicated using a different basis. Support for obp parameters may be indicated on a per band, per CC basis using the corresponding obp ID(s).

Then, at 1608, the base station may receive, from the UE, an indication of RF capability information with reference to at least one band combination and with reference to at least one obp parameter. Support for obp(s) may be indicated in the RF capability information using an obp ID. FIG. 12 illustrates RF capability information 1206 being indicated using the obp IDs from the obp list 1204. FIG. 12 illustrates examples of RF capability information 1206 for band combinations. Other terms may be used for the "RF capability information." For example, as the RF capability information is indicated with reference to band combinations, the RF capability information may be described as band combination information. Each defined band combination may comprise a bandwidth combination set identifier, wherein the RF capability information indicates the RF capability for one of the defined plurality of basebands with reference to the bandwidth combination set identifier. The obp(s) may be common across multiple RF bands. Each band combination may indicate a combination comprising at least one of a numerology, a layer, or a bandwidth. The RF capability information may indicate whether the numerology, the layer, and the bandwidth comprised is supported for a particular band combination. The obp(s) may indicate other parameters than bandwidth, layers, and numerology. Examples of such capabilities/parameters that may be indicated as an obp include, among others, EUTRA capability information, NR capability information, intraband frequency separation information, scaling factor information, cross carrier scheduling information, support for SCell without SSB, control channel monitoring occasions, UE specific UL-DL assignment information, search space sharing information for CA, a time duration for QCL, PDSCH or PUSCH processing information, DMRS information, subcarrier spacing information, supported DL bandwidth, supported UL bandwidth, channel bandwidth information, MIMO layer information for PDSCH or PUSCH, modulation order information, SRS resource information, SUL information, simultaneous transmission information, etc.

As illustrated at 1610, the base station may receive, from the UE, the RF capability information with reference to a bandwidth combination set (BCS), e.g., as described in connection with FIG. 14. The BCS may correspond to a combination of a numerology, a bandwidth, and/or a layer. The bandwidth combination set may correspond to a combination of at least two of a numerology, a bandwidth, and/or a layer. The bandwidth combination set may correspond to a combination of a numerology, a bandwidth, and a layer.

As illustrated at 1612, the base station may receive, from the UE, an indication of the RF capability information with reference to a bandwidth class, e.g., as described in connection with FIG. 13 or 14. The bandwidth class may correspond to a combination of a numerology, a bandwidth, and/or a layer. The bandwidth class may correspond to a combination of at least two of a numerology, a bandwidth, and/or a layer. The bandwidth class may correspond to a combination of a numerology, a bandwidth, and a layer. In other examples, the base station may receive an indication of the UE capability information without an indication of a bandwidth class.

At 1614, the base station determines UE capability(s) using the received indications, e.g., received at 1602. The UE capabilities may comprise any of the capabilities described in connection with FIGS. 4-8 and 12-14.

At 1616, the base station may communicate with the UE based on the UE capability(s) received in signaling at 1602 and determined at 1614.

Figure 17:
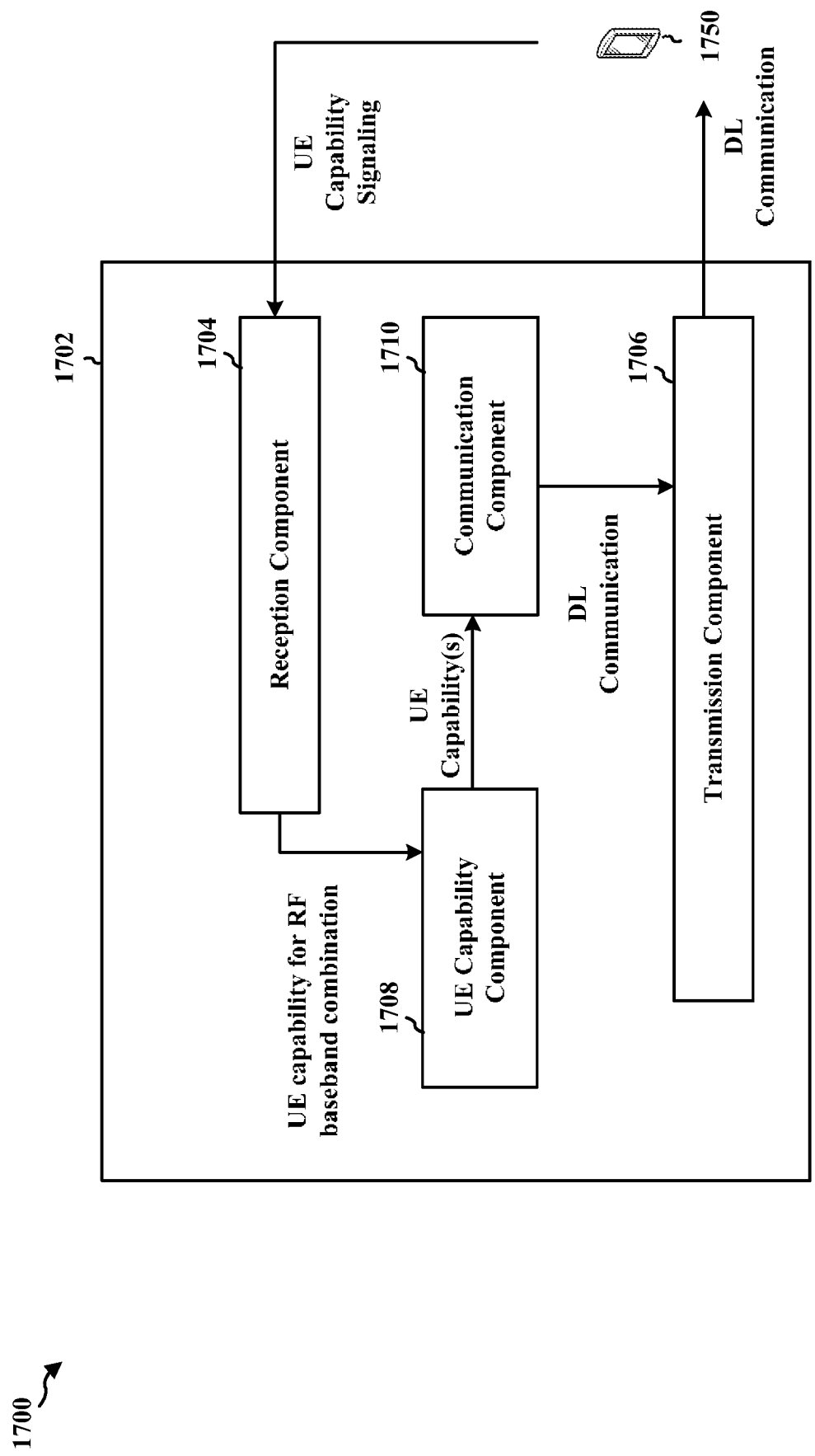
FIG. 17 is a conceptual data flow diagram illustrating the data flow between different means/components in an exemplary apparatus.

FIG. 17 is a conceptual data flow diagram 1700 illustrating the data flow between different means/components in an exemplary apparatus 1702. The apparatus may be a base station 1050 (e.g., base station 102, 180, 310, 1050) receiving UE capability information from a UE (e.g., 104, 350, 1750, the apparatus 1002, 1002'). The communication may be based on 5G/NR. The apparatus includes a reception component 1704 that receives uplink communication from the UE 1750 including UE capability information and a transmission component 1706 that transmits downlink communication to the UE 1750 based on the UE capability information. The reception component 1704 may be configured to receive signaling of UE capability(s), e.g., as described in connection with 1602. The apparatus may include a UE capability component 1708 configured to determine UE capability(s) based on the received signaling, e.g., as described in connection with 1614. The signaling may include BPC information to the base station comprising an indication of at least one baseband and Radio Frequency capability information to the base station with reference to at least one baseband indicated in the BPC, as described in connection with FIG. 7, 8, or 9. The UE capability information may be signaled using a baseband explicitly signaled to the base station and/or a baseband definition, wherein each baseband indicates a combination of a numerology, a layer, and a bandwidth. The signaling may include other band combination parameters, bandwidth class(es), and/or bandwidth combination set(s) as described in connection with FIGS. 12-14 and 16. Thus, the UE capability component may be configured to determine UE capability with reference to at least one band combination and obp parameters indicated by the UE. The RF capability information may indicate RF capability with reference to at least one other band combination parameter, e.g., as described in connection with at least FIGS. 12 and 16. The apparatus may include a communication component 1710 configured to communication with the UE based on the UE capability information, e.g., as described in connection with 1616.

The apparatus may include additional components that perform each of the blocks of the algorithm in the aforementioned flowchart of FIG. 16. As such, each block in the aforementioned flowchart of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
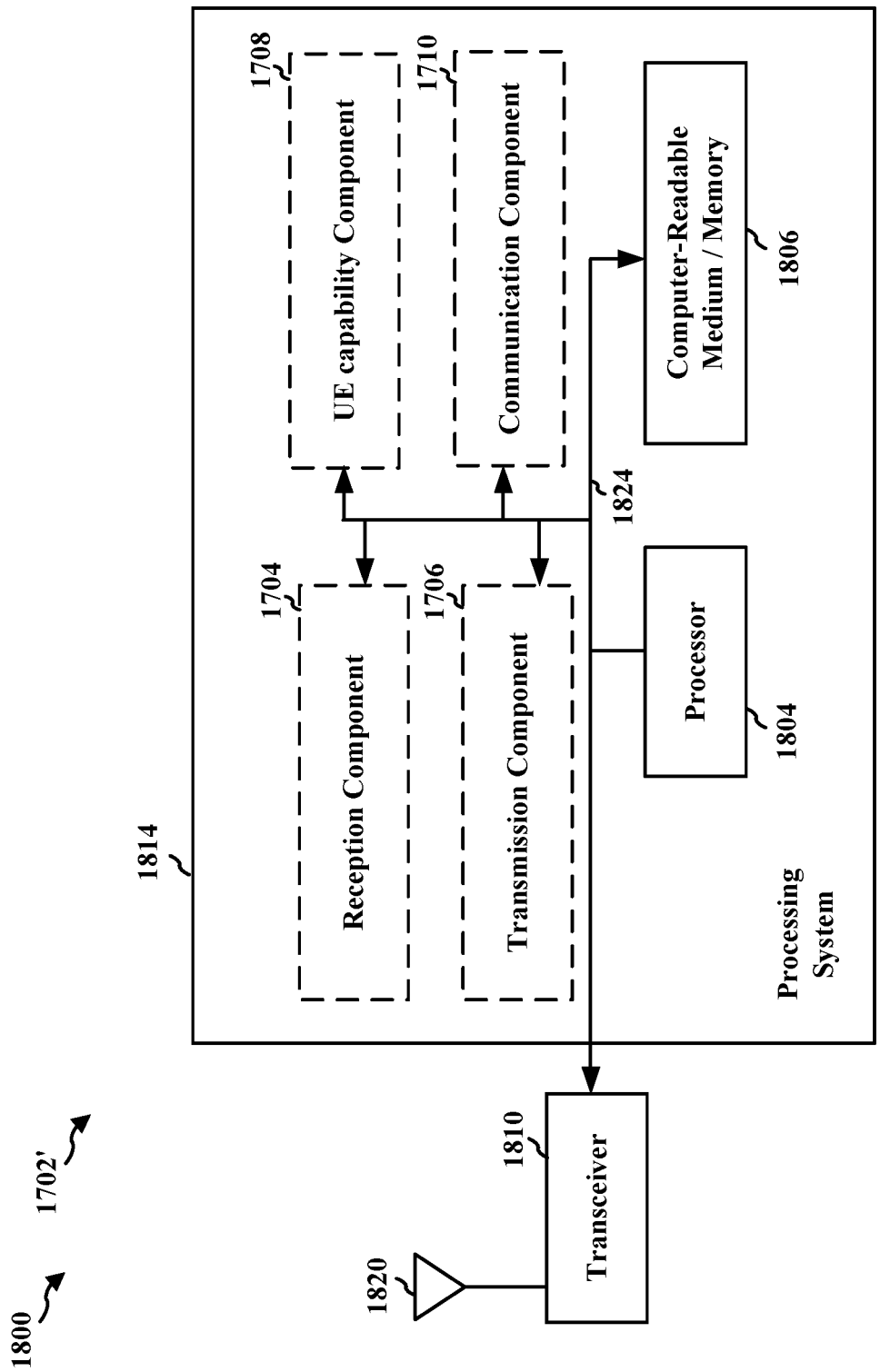
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, 1710, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1706, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1708, 1710. The components may be software components running in the processor 1804, resident/stored in the computer readable medium/memory 1806, one or more hardware components coupled to the processor 1804, or some combination thereof. The processing system 1814 may be a component of the base station 310 and may include the memory 376 and/or at least one of the TX processor 316, the RX processor 370, and the controller/processor 375.

In one configuration, the apparatus 1702/1702' for wireless communication includes means for receiving signaling of UE capability information, means for determining UE capability(s) based on the received signaling, and means for communicating with the UE based on the determined UE capability(s). The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
determining UE capability information comprising Radio Frequency (RF) capability information and baseband capability information, the baseband capability information comprising at least one other baseband parameter that indicates a numerology, the RF capability information indicating RF capability with reference to at least one band combination, wherein the RF capability information comprises an index of the at least one other baseband parameter that indicates whether the numerology is supported for a particular RF band within the at least one band combination; and
signaling the UE capability information to a base station.

2. The method of claim 1, wherein the at least one other baseband parameter is indicated per band.

3. The method of claim 2, wherein support for a baseband parameter of the at least one other baseband parameter is indicated using an Identifier (ID).

4. The method of claim 1, wherein support for a baseband parameter of the at least one other baseband parameter is indicated per component carrier (CC).

5. The method of claim 4, wherein the support for the baseband parameter of the at least one other baseband parameter for a CC is indicated using an Identifier (ID).

6. The method of claim 4, wherein the support for the baseband parameter of the at least one other baseband parameter is indicated per band, and per CC.

7. The method of claim 1, wherein the RF capability information indicates support for a baseband parameter of the at least one other baseband parameter with reference to a corresponding identifier (ID) of the baseband parameter.

8. The method of claim 7, wherein the baseband parameter indicates support of band parameters with reference to the corresponding ID.

9. The method of claim 8, wherein the baseband parameter indicates support for Component Carrier (CC) parameters with reference to the corresponding ID.

10. The method of claim 1, wherein the at least one other baseband parameter is comprised in a list of capabilities supported by the UE.

11. The method of claim 10, wherein each capability in the list of capabilities has a corresponding other baseband parameter identifier (ID).

12. The method of claim 1, wherein the at least one band combination comprises a bandwidth combination set identifier, wherein the RF capability information indicates an RF capability for one of a plurality of basebands with reference to the bandwidth combination set identifier.

13. The method of claim 1, wherein the at least one other baseband parameter is common across multiple RF bands.

14. The method of claim 1, wherein the at least one band combination indicates a combination comprising the numerology and at least one of a layer or a bandwidth.

15. The method of claim 14, wherein the RF capability information indicates whether the numerology, the layer, and the bandwidth is supported for a particular band combination.

16. The method of claim 1, wherein the UE capability information is signaled without an indication of a bandwidth class.

17. The method of claim 1, wherein the at least one band combination defines a plurality of band combinations, wherein the at least one band combination comprises the numerology and at least one of a layer and a bandwidth class of a plurality of bandwidth classes, and wherein the RF capability information indicates an RF capability for one of the plurality of bandwidth classes.

18. An apparatus for wireless communication at a user equipment (UE), comprising:
  means for determining UE capability information comprising Radio Frequency (RF) capability information and baseband capability information, the baseband capability information comprising at least one other baseband parameter that indicates a numerology, the RF capability information indicating RF capability with reference to at least one band combination, wherein the RF capability information comprises an index of the at least one other baseband parameter that indicates whether the numerology is supported for a particular RF band within the at least one band combination; and
  means for signaling the UE capability information to a base station.

19. The apparatus of claim 18, wherein support for a baseband parameter of the at least one other baseband parameter is indicated per band using an Identifier (ID).

20. The apparatus of claim 18, wherein support for a baseband parameter of the at least one other baseband parameter is indicated per component carrier (CC) and using an Identifier (ID).

21. The apparatus of claim 20, wherein the support for the baseband parameter of the at least one other baseband parameter is indicated per band, and per CC.

22. The apparatus of claim 18, wherein the RF capability information indicates support for a baseband parameter of the at least one other baseband parameter with reference to a corresponding identifier (ID) of the at least one other baseband parameter.

23. The apparatus of claim 22, wherein the support for Component Carrier (CC) parameters is indicated with reference to the corresponding ID.

24. The apparatus of claim 18, wherein the at least one other baseband parameter is comprised in a list of capabilities supported by the UE, wherein each capability in the list of capabilities has a corresponding other baseband parameter identifier (ID).

25. The apparatus of claim 18, wherein the at least one band combination comprises a bandwidth combination set identifier, wherein the RF capability information indicates an RF capability for one of a plurality of basebands with reference to the bandwidth combination set identifier.

26. The apparatus of claim 18, wherein the at least one other baseband parameter is common across multiple RF bands.

27. The apparatus of claim 26, wherein the at least one band combination indicates a combination comprising the numerology and at least one of a layer or a bandwidth.

28. The apparatus of claim 27, wherein the RF capability information indicates whether the numerology, the layer, and the bandwidth is supported for a particular band combination.

29. The apparatus of claim 18, wherein the UE capability information is signaled without an indication of a bandwidth class.

30. The apparatus of claim 18, wherein the at least one band combination defines a plurality of band combinations, wherein the at least one band combination comprises the numerology and at least one of a layer and a bandwidth class of a plurality of bandwidth classes, and wherein the RF capability information indicates an RF capability for one of the plurality of bandwidth classes.

31. An apparatus for wireless communication at a user equipment (UE), comprising:
  a memory; and
  at least one processor coupled to the memory and configured to:
    determine UE capability information comprising Radio Frequency (RF) capability information and baseband capability information, the baseband capability information comprising at least one other baseband parameter that indicates a numerology, the RF capability information indicating RF capability with reference to at least one band combination, wherein the RF capability information comprises an index of the at least one other baseband parameter that indicates whether the numerology is supported for a particular RF band within the at least one band combination, and signal UE capability information to a base station.

32. The apparatus of claim 31, wherein support for a baseband parameter of the at least one other baseband parameter is indicated per band using an Identifier (ID).

33. The apparatus of claim 31, wherein support for the at least one other baseband parameter is indicated per component carrier (CC) using an Identifier (ID).

34. The apparatus of claim 33, wherein support for the at least one other baseband parameter is indicated per band, and per CC.

35. The apparatus of claim 31, wherein the RF capability information indicates support for a baseband parameter of the at least one other baseband parameter with reference to a corresponding identifier (ID) of the at least one other baseband parameter.

36. The apparatus of claim 35, wherein the at least one other baseband parameter indicates the support for Component Carrier (CC) parameters with reference to the corresponding ID.

37. The apparatus of claim 31, wherein the at least one other baseband parameter is comprised in a list of capabilities supported by the UE, wherein each capability in the list of capabilities has a corresponding other baseband parameter identifier (ID).

38. The apparatus of claim 31, wherein the at least one band combination comprises a bandwidth combination set identifier, wherein the RF capability information indicates an RF capability for one of a plurality of basebands with reference to the bandwidth combination set identifier.

39. The apparatus of claim 31, wherein the at least one other baseband parameter is common across multiple RF bands.

40. The apparatus of claim 39, wherein the at least one band combination indicates a combination comprising the numerology and at least one of a layer or a bandwidth.

41. The apparatus of claim 40, wherein the RF capability information indicates whether the numerology, the layer, and the bandwidth is supported for a particular band combination.

42. The apparatus of claim 31, wherein the UE capability information is signaled without an indication of a bandwidth class.

43. The apparatus of claim 31, wherein the at least one band combination defines a plurality of band combinations, wherein the at least one band combination comprises the numerology and at least one of a layer and a bandwidth class of a plurality of bandwidth classes, and wherein the RF capability information indicates an RF capability for one of the plurality of bandwidth classes.

44. A non-transitory computer-readable medium storing computer executable code for wireless communication at a user equipment (UE), the code when executed by a processor cause the processor to:
    determine UE capability information comprising Radio Frequency (RF) capability information and baseband capability information, the baseband capability information comprising at least one other baseband parameter that indicates a numerology, the RF capability information indicating RF capability with reference to at least one band combination, wherein the RF capability information comprises an index of the at least one other baseband parameter that indicates whether the numerology is supported for a particular RF band within the at least one band combination, and
    signal UE capability information to a base station.

* * * * *